US007716125B2

(12) United States Patent
Shavit et al.

(10) Patent No.: US 7,716,125 B2
(45) Date of Patent: May 11, 2010

(54) NETWORKED LOAN MARKET AND LENDING MANAGEMENT SYSTEM

(75) Inventors: Eyal Shavit, Concord, MA (US); Yoni Cheifetz, Tel-Aviv (IL); Nava Goren, London (GB)

(73) Assignee: Axcessnet Innovations LLC, Lexington, MA (US)

( * ) Notice: Subject to any disclaimer, the term of this patent is extended or adjusted under 35 U.S.C. 154(b) by 108 days.

(21) Appl. No.: 11/501,057

(22) Filed: Aug. 9, 2006

(65) Prior Publication Data
US 2007/0061248 A1 Mar. 15, 2007

Related U.S. Application Data

(60) Provisional application No. 60/706,751, filed on Aug. 10, 2005, provisional application No. 60/796,857, filed on May 3, 2006.

(51) Int. Cl.
G06Q 40/00 (2006.01)
(52) U.S. Cl. ........................................................ 705/38
(58) Field of Classification Search .................... 705/38
See application file for complete search history.

(56) References Cited

U.S. PATENT DOCUMENTS

| 5,884,285 | A | * | 3/1999 | Atkins | 705/36 R |
| 6,012,044 | A | * | 1/2000 | Maggioncalda et al. | 705/36 R |
| 6,078,904 | A | * | 6/2000 | Rebane | 705/36 R |
| 6,112,188 | A | * | 8/2000 | Hartnett | 705/36 R |
| 6,192,347 | B1 | * | 2/2001 | Graff | 705/36 R |
| 6,421,653 | B1 | * | 7/2002 | May | 705/36 R |
| 6,654,727 | B2 | * | 11/2003 | Tilton | 705/36 R |
| 6,691,094 | B1 | * | 2/2004 | Herschkorn | 705/37 |
| 6,920,434 | B1 | * | 7/2005 | Cossette | 705/38 |
| 7,020,626 | B1 | * | 3/2006 | Eng et al. | 705/27 |
| 7,089,503 | B1 | * | 8/2006 | Bloomquist et al. | 715/780 |
| 7,103,556 | B2 | * | 9/2006 | Del Rey et al. | 705/1 |
| 7,149,720 | B2 | * | 12/2006 | Shepherd | 705/37 |
| 7,310,616 | B2 | * | 12/2007 | Sugahara | 705/37 |

(Continued)

OTHER PUBLICATIONS

Whole Loan Sales Develop in Europe, Nora Colomer, Asset Securitization Report, Aug. 1, 2005.*

(Continued)

Primary Examiner—Alexander Kalinowski
Assistant Examiner—Bruce I Ebersman
(74) Attorney, Agent, or Firm—Occhiuti Rohlicek & Tsao LLP

(57) ABSTRACT

A system for matching lending orders and borrowing orders includes a borrowing order receiver, a lending order receiver, and a matcher. The borrowing order receiver is configured to receive borrowing orders from at least one borrower, each borrowing order including borrower-requested loan terms. The lending order receiver is configured to receive lending orders from at least one lender, each lending order comprising lender-requested loan terms. The matcher is configured to automatically identify a plurality of borrowing orders each having borrower-requested loan terms that satisfy the lender-requested loan terms of a respective current lending order, and select from amongst the identified plurality of borrowing orders a set of borrowing orders to be provided as a match of the respective current lending order, wherein the borrowing orders of the sets are selected so as to optimize said respective provided matches with respect to criteria of respective operator-definable utility functions.

48 Claims, 23 Drawing Sheets

U.S. PATENT DOCUMENTS

| | | | |
|---|---|---|---|
| 7,330,826 B1* | 2/2008 | Porat et al. | 705/26 |
| 2001/0037284 A1* | 11/2001 | Finkelstein et al. | 705/37 |
| 2001/0054022 A1* | 12/2001 | Louie et al. | 705/38 |
| 2002/0029188 A1* | 3/2002 | Schmid | 705/38 |
| 2002/0038285 A1* | 3/2002 | Golden et al. | 705/38 |
| 2002/0116327 A1* | 8/2002 | Srinivasan | 705/38 |
| 2002/0143694 A1* | 10/2002 | Young et al. | 705/37 |
| 2003/0018558 A1* | 1/2003 | Heffner et al. | 705/37 |
| 2003/0036993 A1* | 2/2003 | Parthasarathy | 705/38 |
| 2003/0135450 A1* | 7/2003 | Aguais et al. | 705/38 |
| 2003/0153414 A1* | 8/2003 | Nye | 473/485 |
| 2004/0006531 A1* | 1/2004 | Kwan | 705/37 |
| 2004/0083152 A1* | 4/2004 | Markov et al. | 705/36 |
| 2004/0088241 A1* | 5/2004 | Rebane et al. | 705/37 |
| 2004/0133504 A1* | 7/2004 | Dalal | 705/37 |
| 2006/0031149 A1* | 2/2006 | Lyons et al. | 705/35 |
| 2006/0080217 A1* | 4/2006 | Blackall et al. | 705/37 |
| 2007/0027791 A1* | 2/2007 | Young et al. | 705/37 |
| 2007/0226128 A1* | 9/2007 | Wiryawan et al. | 705/38 |

OTHER PUBLICATIONS

SCITI Trust II to engage in Securities Lending Canada Newswire Feb. 4, 2005.*

* cited by examiner

NETWORKED LOAN MARKET AND LENDING MANAGEMENT SYSTEM

RELATED APPLICATIONS

The present application claims priority from U.S. Provisional Patent Application No. 60/706,751, filed on Aug. 10, 2005, and U.S. Provisional Patent Application No. 60/796,857, filed on May 3, 2006, the contents of which are incorporated herein by reference.

FIELD AND BACKGROUND OF THE INVENTION

The present invention relates to generating and processing lending and borrowing transactions and more particularly, but not exclusively to a system and a method for generating and processing lending and borrowing transactions by means of matching between borrowers and lenders.

Borrowed money is a primary source of capital for both businesses and consumers. Banks and other financial institutions are the primary facilitators, bridging between lenders and borrowers, managing risks and collecting fees in the process.

Banks borrow money from depositors through certificates of deposit, checking accounts, money market accounts and other debt instruments. Depositors lend their money to the bank against the bank's balance sheet, relying partly on government insurance (such as the Federal Deposit Insurance Corporation—FDIC) and government regulation. The bank, in turn, lends this money to both business and consumers. It is the bank's responsibility to assess the lending risk, to verify collaterals, to manage the flow of funds and to take action in cases of delinquency by borrowers. No direct contractual relationship exits between the original lenders and the eventual borrowers who receive the money from the bank.

Governments, Government Agencies and commercial enterprises routinely issue bonds and other debt instruments. With the exception of government issued debt instruments, such securities carry the credit risk of the issuers, are relatively liquid (say, traded at various exchanges), and have preset maturity schedules (the schedules of repayments by dates and amounts), and prepayment options. Bonds are usually issued with respect to large sums of money.

Banks and other financial institutions package and sell many other forms of debt securities and debt derivatives. In essence, in these packages, a number of loans (each with its terms and conditions and risks profile) are owned by a single entity, whose securities (debt or equity) are directly linked to the risks and the performance of the loans or derivatives owned by the entity. There is no direct contractual relationship between the securities holders of such entity and the borrowers who receive the packaged loans.

Micro-Lending, within and outside the traditional banking sector, involves lending of relatively small amounts (typically less than $25,000), to micro entities (individuals or organizations) who lack the collateral or the capacity to convince traditional banks that they are able to repay a loan, and are therefore considered a risky client group. Micro entities frequently have limited track record or financial reporting capacity. The costs of processing small loans and the risks involved in lending to micro entities make financial institutions hesitant to develop services for micro entities and small time entrepreneurs. All these factors limit the access to credit available for micro entities.

There are key differences in the service delivery principles of micro-versus traditional lending. Micro lending is characterized by its small loan size, the non-traditional aspects of collateral requirements and assessment of credit worthiness, and quick and easy access. The relatively high transaction costs of micro-lending are covered either through above market level interest rates or subsidies. No direct contractual relationship exits between the sources of capital used by the micro-lenders and the eventual micro-borrowers who receive the money.

Financial exchanges allow buyers and sellers to trade various types of securities (stocks, bonds, futures, options). Taking orders from both buyers and sellers, these exchanges match sell or buy orders for individual securities based on price and quantity, to generate trades.

With the rise of the Internet, and the growth of e-commerce, a new breed of exchanges, i.e. electronic marketplaces, has developed. These marketplaces, used mainly as auctions for trading goods, are either Consumer-to-Consumer (C2C) marketplaces (such as eBay™), Business-to-Business service providers (B2B) (such as Fiber2fashion™), or Business-to-Consumer (B2C) service providers (such as Yahoo.com™).

Currently, there are a few electronic market lending places. For example, Prosper Marketplace Inc. offers an electronic marketplace where borrowers may organize in a group, for negotiating better loan rates for the group.

In another example, Zopa Ltd. offers a web site where lenders may define the minimum required credit rating of the borrowers (according to a single rating agency) and the desired interest rate. Only borrowers rated by the single rating agency may choose to agree to the loan terms. The funding offered by the lender under the loan terms is arbitrarily divided between the borrowers that meet a specific credit rate, such that each borrower is allocated a small chunk of the funding (less than 1/50).

Both financial exchanges and electronic marketplaces implement one or more auction mechanisms to match buy orders and sell orders, for generating transactions. An auction is defined as any negotiation mechanism that is: mediated, well-specified (i.e., runs according to explicit rules) and market-based (i.e., determines an exchange in terms of standard currency).

Auctions can be either single dimensional—where the only bid dimensions are price and quantity of a single good, or multi-dimensional—where other attributes of the goods are also negotiated. For example, if the goods are loans, the other attributes may include the collaterals offered by the borrowers. Single dimensional auctions can be further subdivided into one-sided auctions and two-sided auctions.

Two-sided auctions include the Continuous Double Auction (CDA) and Call Market (periodic clear) types described herein below.

Two-sided auctions form the basis of many of today's financial exchanges. For example, NASDAQ has a Continuous Double Auction process, in which every new order is matched immediately if possible, and the remaining orders are put on the order book. The Arizona Stock Exchange (AZX) operates a Call Market ("periodic clear") in which orders are matched periodically.

Multi-dimensional auctions include multi-attribute (matching a single good with multiple attributes) and multi-good mechanisms.

An auction operator performs three types of activities: receiving bids, disseminating information and arranging trades (clearing). Therefore, in analyzing the different types of auctions, one can use three dimensions: bidding rules, clearing policy and information revelation policy.

Current systems and methods for processing lending and borrowing transactions have several disadvantages.

Businesses and consumers commonly borrow at local banks or financial institutions having specific knowledge and information about the local market, the community and often the individual borrowers.

The emergence of credit reporting agencies and the Internet have broadened the access to such information, but have not eliminated the trust and long-term relationships aspects of lending and borrowing decisions. Lenders without local presence have only limited direct access to local borrowers. Similarly, borrowers are limited in their access to lenders without local presence.

The banking system is characterized by high costs. The high costs include both fixed costs, such as: fixed assets (branch offices, distributed IT infrastructure, etc.), and variable costs of operation, which include required capital reserves expensive workforce, information systems services, insurance, and regulatory costs.

The costs include both operational costs (bank branch operation costs, salaries, providing local physical points of service to the public), and financial costs associated with the fact that banks need to hold reserves that cover the risk associated with the fact that the bank is a part of the transaction The high costs are reflected by a large spread between the interest rates paid to lenders and those collected from borrowers.

The fact that the loan market is characterized by a limited number of mega banks and financial institutions using a limited number of lending policies, limits the options available to a specific borrower based on his unique circumstances.

Most banks and lending institutions utilize a limited number of inflexible lending processes. The limited and inflexible processes prevent a potentially major increase in the number of lenders able to manage their risk in a different way, which would have resulted, had there been more flexible lending processes available.

More flexible lending processes may create higher yield for the lenders and more options for the borrowers. (i.e., a partial advance against the total amount of the loan before verifying the collaterals, a lower interest rate in return for a portion of the borrower's earning from a particular activity, additional means of payment such as bartered services, etc.).

Currently, lending institutions, banks, and other financial institutions deal with very limited and finite number and types of risk profiles. Consequently, the financial institutions lack the ability to address very specific situations that current risk profiles fail to address. Different lenders may have different subjective risk assessment of the same borrower. For example lending to a Chinese borrower may be deemed safe for one lender and too risky to another lender. More opportunities will be available if many borrowers and lenders participate in a large market where each of them can find what he considers the best deal.

Borrowers of small amounts from thousands of Dollars to a few Million Dollars are limited in their ability to issue public debt securities. Even if they can issue such securities, the cost may be prohibitively high and the regulatory requirements may be complex. For example, there is a need to meet the Sarbanes-Oxley (SOX) requirements. Sarbanes-Oxley (SOX) is a US law which was passed in 2002, and aims at strengthening corporate governance and restoring investor's confidence.

Consumers and many businesses invest their short term cash surpluses in low interest money market accounts because they do not have a better way to maximize their gain from small amounts available for relatively short periods.

The public market for small debt issues is very limited and illiquid and there is almost no market for non-public debt issues.

Currently, lenders lack the ability to leverage their knowledge or assessments in lending to particular industries, geographies, or other profiles of entities. That as to say, the lenders have to trust a bank or another financial institution to make the decisions that are reflected in the interest rate available to them. The interest rate is based on average costs and risks across a very big loan portfolio of the bank in general, rather than a target subpopulation of borrowers the lenders are willing to finance.

Current lending processes represent cumbersome, inefficient and costly processes that were appropriate in the past. The processes fail to weigh together the needs of borrowers, lenders, and other parties involved in the lending process. Current lenders and borrowers face a rather limited number of choices, with regards to the lenders/borrowers, lending/borrowing support services—which are limited to traditional banking systems, etc.

There is thus a widely recognized need for, and it would be highly advantageous to have, a system and a method, devoid of the above limitations.

SUMMARY OF THE INVENTION

Preferred embodiments of the present invention provide in one aspect a flexible loan market and/or a lending management system.

The above aspect provides for such a flexible loan market that is open to borrowers and lenders large and small.

The flexibility of the loan market allows each user, whether acting as a borrower or a lender, to get the terms that best suit him.

The loan market is preferably networked and allows participants to act as borrowers, lenders, and subsidizers. The loan market manages loans throughout their lifetime from inception to completion of repayment. That is to say it manages the matching of borrowers to lenders and subsidizers at the start creating one or more composite loan and portfolio loans each made of one or more atomic loans. The loan market manages collection of funds from lenders and transferring composite loan funds to borrowers, collecting repayment funds from borrowers, allocating such repayment funds among the portfolio loans and transferring repayment amounts to lenders. The loan market collects funds from subsidizers at the appropriate time, and distribute them according to the terms of the subsidy. It also manages the sale and transfer of a loan from lender to lender The operational aspects of the market may be carried out by a network of third parties, certified and orchestrated by the market operation.

According to one aspect of the present invention there is provided an apparatus for generating and processing lending and borrowing orders, comprising: a borrowing order receiver, configured to receive at least one borrowing order from at least one borrower, the borrowing order comprising borrower-requested loan terms, a lending order receiver, configured to receive at least one lending order from at least one lender, the lending order comprising lender-requested loan terms, and a matcher, associated with the borrowing order receiver and the lending order receiver, and configured to automatically provide at least one match to a respective current lending order from amongst the borrowing orders, such that the matched orders are mutually satisfied with respect to the loan terms.

According to a second aspect of the present invention there is provided a method for generating and processing lending and borrowing orders, comprising: receiving at least one borrowing order from at least one borrower, the borrowing order comprising borrower-requested loan terms, receiving at least one lending order from at least one lender, the lending order comprising lender-requested loan terms; and automatically providing a match to a current lending order from amongst the borrowing orders, such that the matched orders are mutually satisfied with respect to the loan terms.

According to a third aspect of the present invention there is provided an apparatus for managing a workflow of processes for initiating and executing composite loans and portfolio loans as well as the processes of collecting, aggregating and distributing funds.

According to a fourth aspect of the present invention there is provided a method for managing the life cycle of composite loans and portfolio loans from initiation, signing the loans agreements, handling collaterals, monitoring the collection and distribution of funds, handling uncollected obligations and issuing appropriate reports.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention.

In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1a is a block diagram schematically illustrating a loan market implementing an apparatus according to a preferred embodiment of the present invention.

FIG. 1b is a block diagram illustrating a first apparatus for generating and processing lending and borrowing orders, according to a preferred embodiment of the present invention.

FIG. 1c is a flowchart illustrating a method for collection management, according to a preferred embodiment of the present invention.

FIG. 2 is a block diagram illustrating a second apparatus for generating and processing lending and borrowing orders, according to a preferred embodiment of the present invention.

FIG. 2a is a block diagram mapping clusters of processes carried out by an apparatus for loan market management, according to a preferred embodiment of the present invention.

FIG. 2b is a second block diagram mapping processes carried out by an apparatus for loan market management, according to a preferred embodiment of the present invention.

FIG. 3 is a flowchart illustrating a first method for generating and processing lending and borrowing orders, according to a preferred embodiment of the present invention.

FIG. 4 is a flowchart illustrating a method for handling user interactions, according to a preferred embodiment of the present invention.

FIG. 4a is a flowchart illustrating a method for external conditions verification, according to a preferred embodiment of the present invention.

FIG. 5 is a flowchart illustrating a method for user management, according to a preferred embodiment of the present invention.

FIG. 5a is a flowchart illustrating a method for user rating, according to a preferred embodiment of the present invention.

Figure 5:
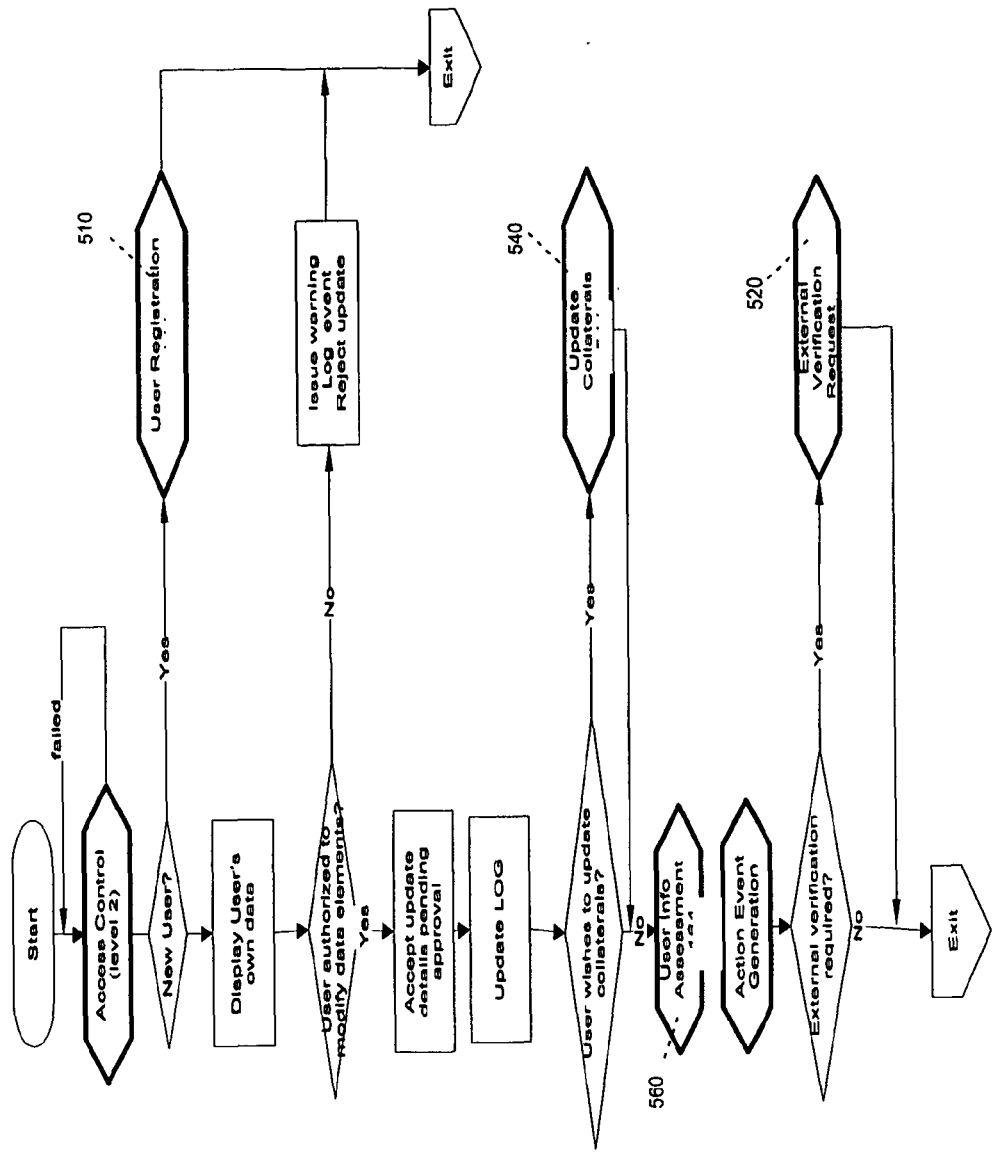
Figure 5A:
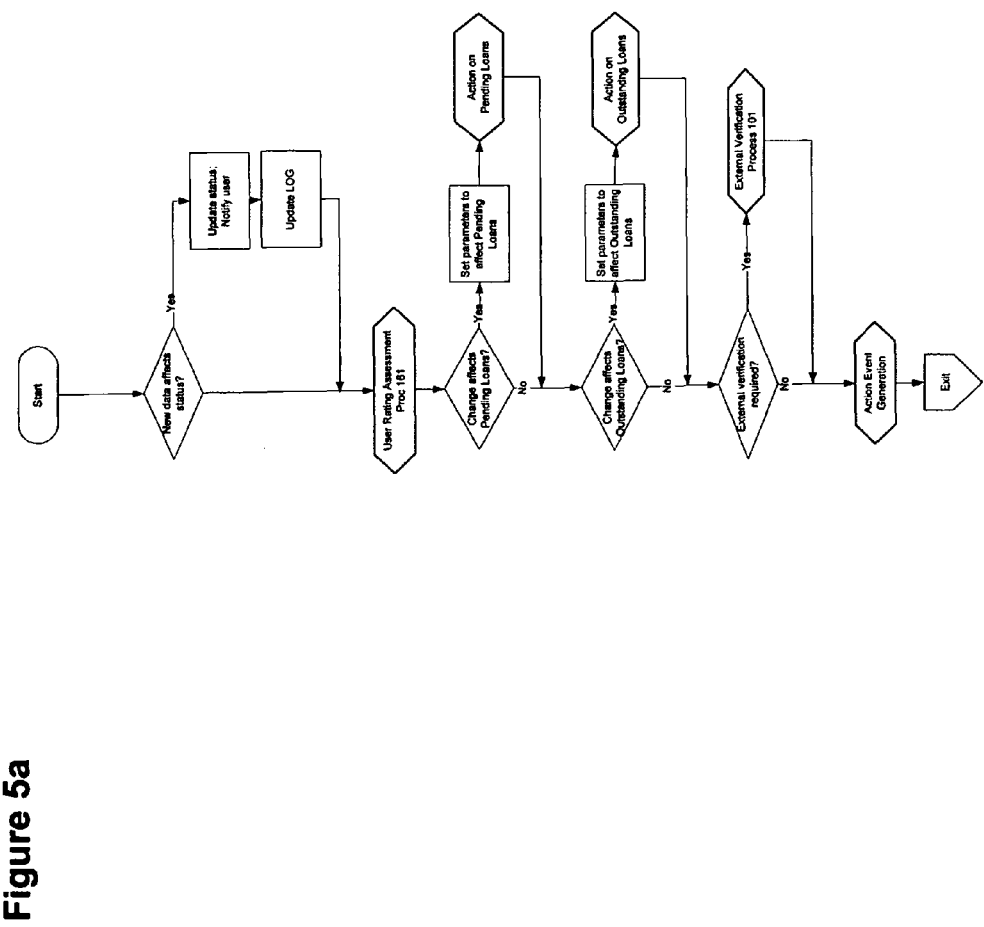
Figure 5B:
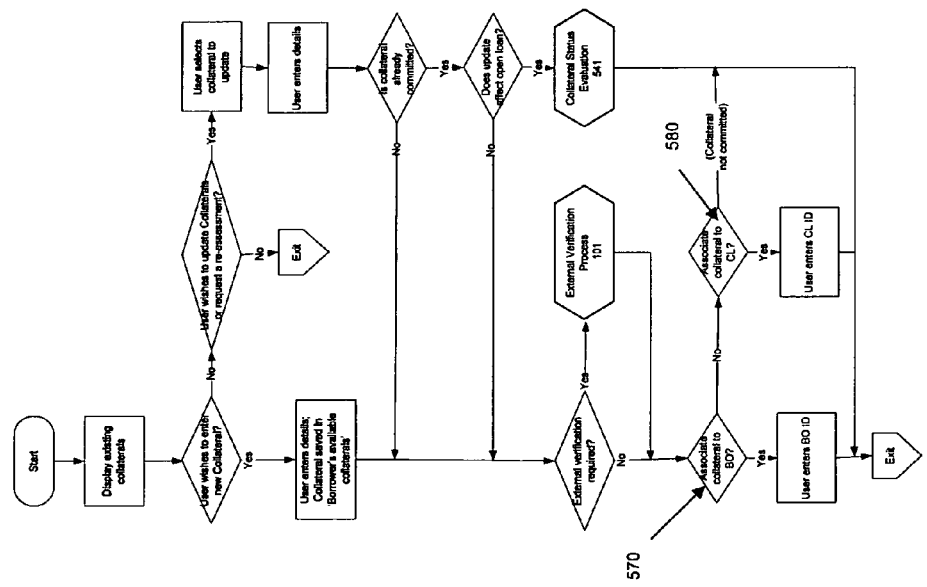

FIG. 5b is a flowchart illustrating a method for user collateral management, according to a preferred embodiment of the present invention.

Figure 6A:
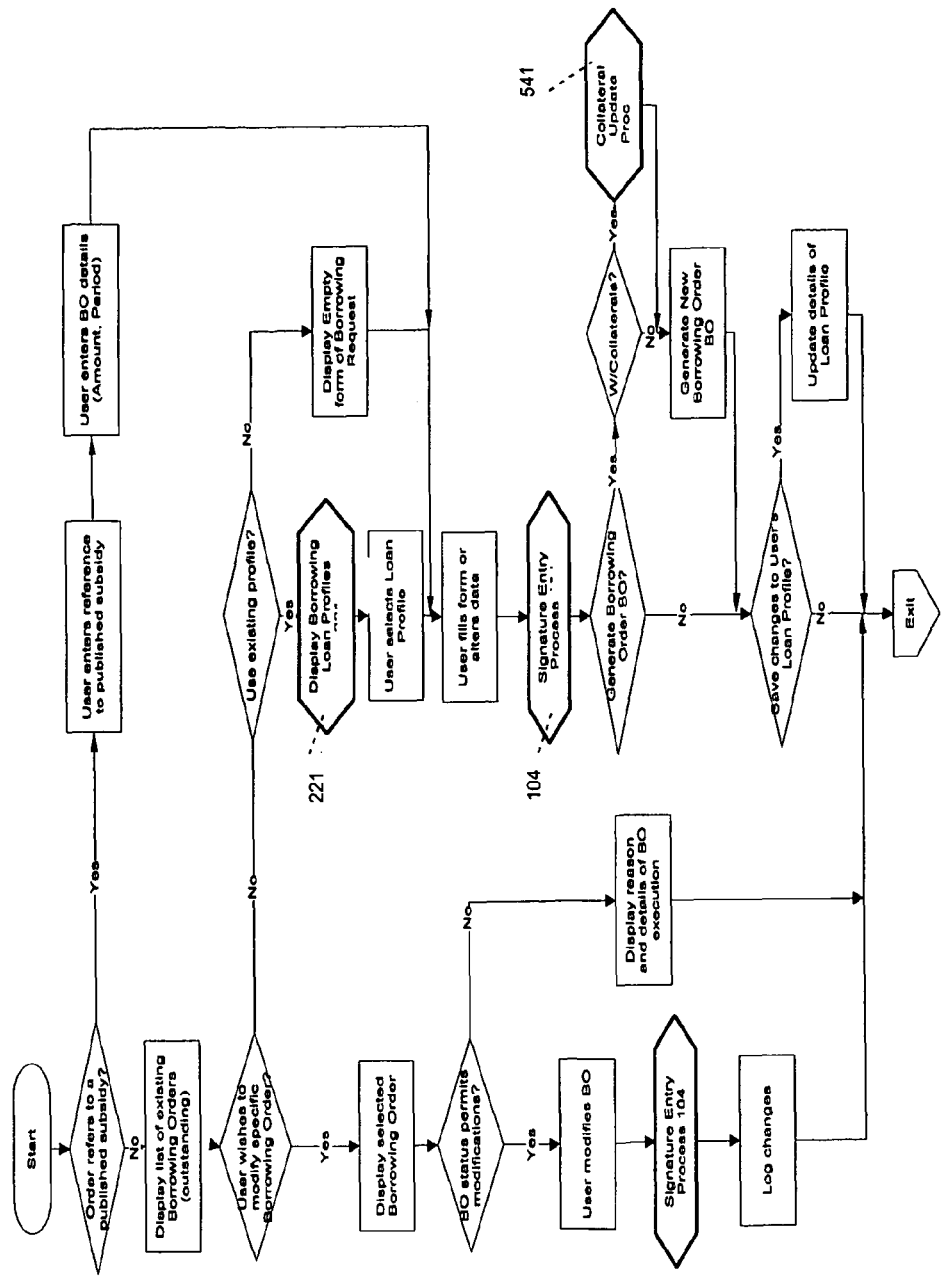

FIG. 6a is a flowchart illustrating a method for borrowing order receiving and management, according to a preferred embodiment of the present invention.

Figure 6B:
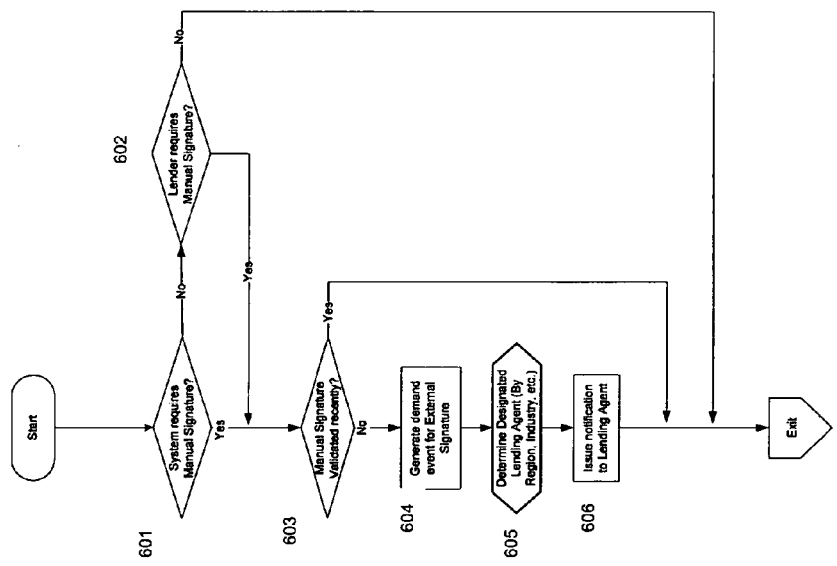

FIG. 6b is a flowchart illustrating a method for signature verification, according to a preferred embodiment of the present invention.

Figure 7:
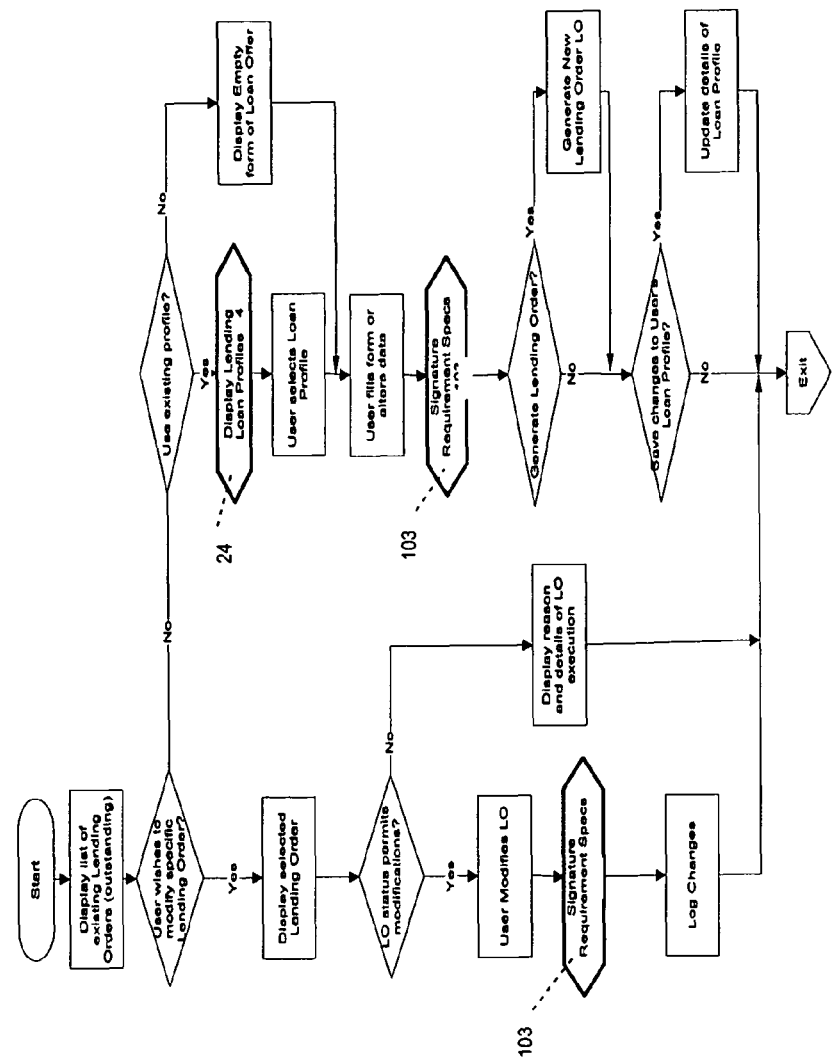

FIG. 7 is a flowchart illustrating a method for lending order receiving and management, according to a preferred embodiment of the present invention.

Figure 8:
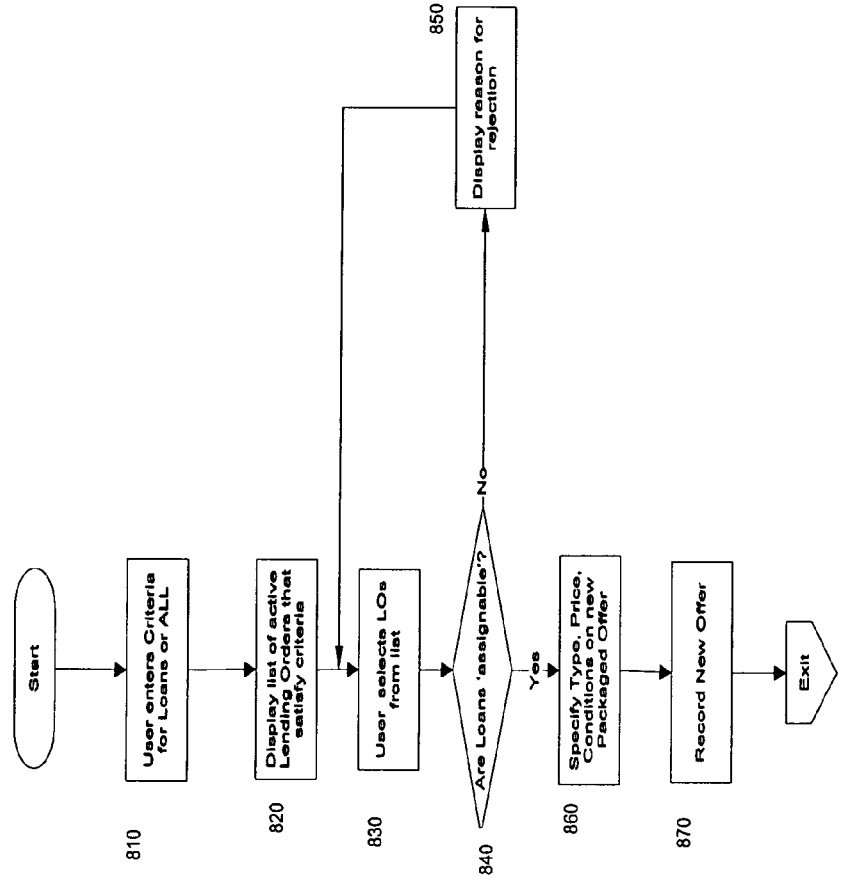

FIG. 8 is a flowchart illustrating a method for managing a secondary loan sale, according to a preferred embodiment of the present invention.

Figure 9A:
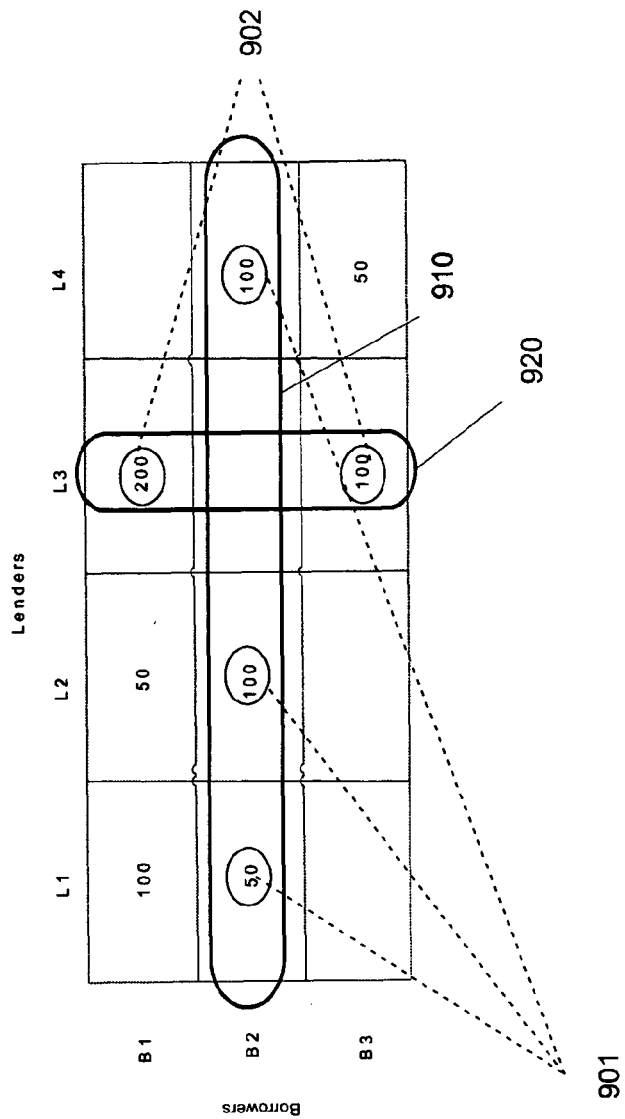

FIG. 9a which is a block diagram illustrating an exemplary composite loan and portfolio loan, according to a preferred embodiment of the present invention.

Figure 9B:
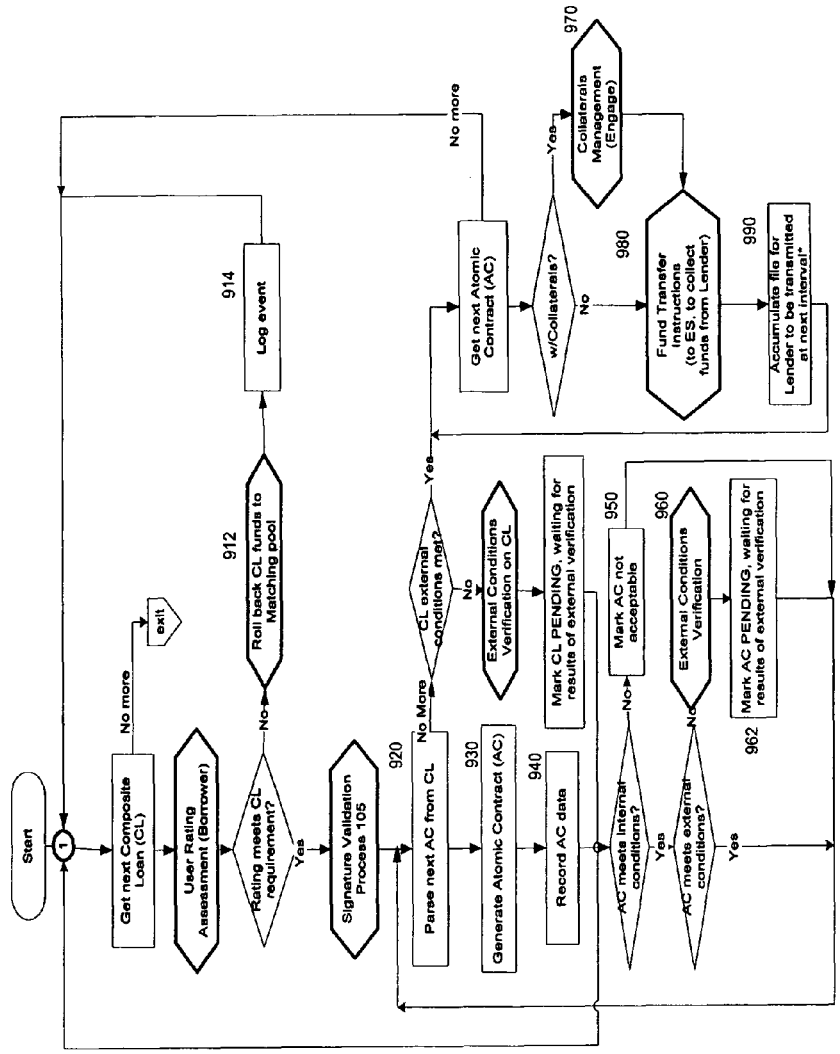

FIG. 9b is a flowchart illustrating a method for contract management of a composite loan, according to a preferred embodiment of the present invention.

Figure 10:
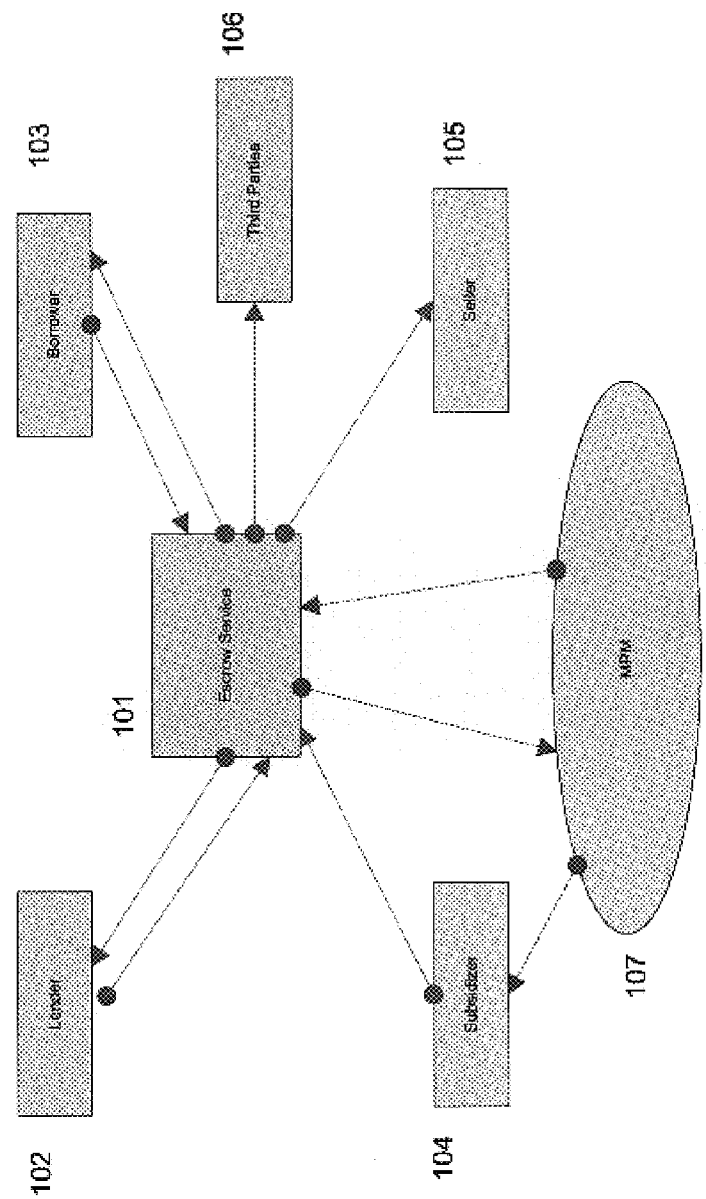

FIG. 10 is a block diagram illustrating interactions between escrow service providers and other parties in a loan market, according to a preferred embodiment of the present invention.

Figure 10A:
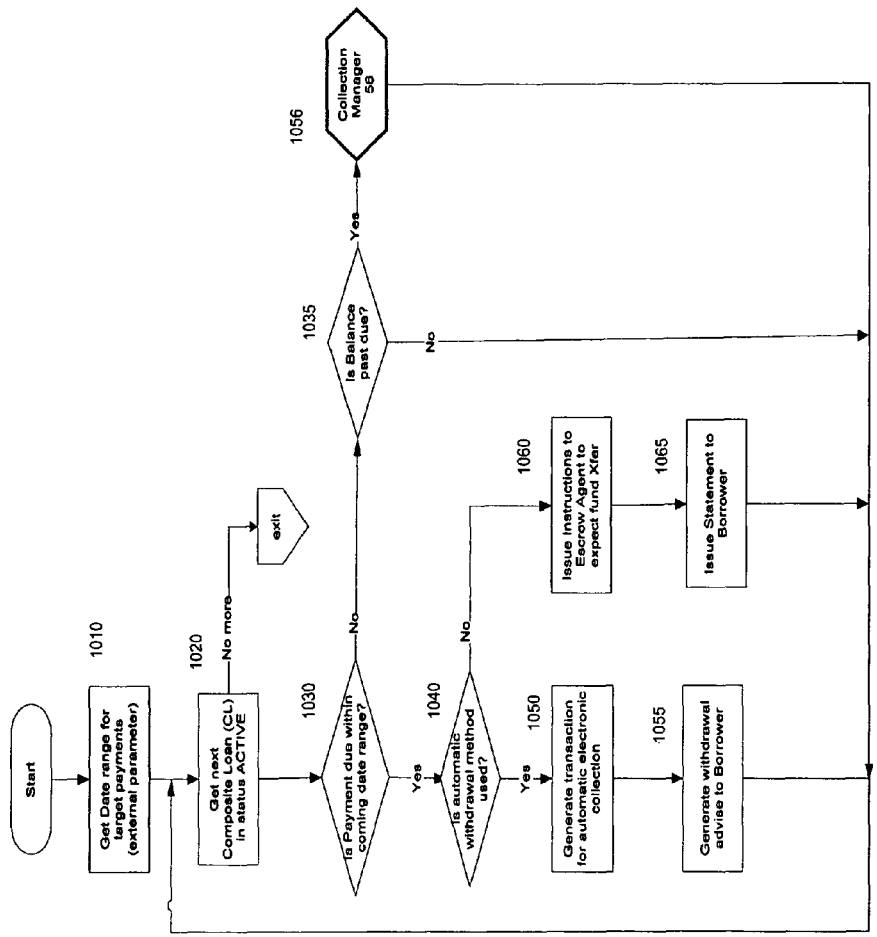

FIG. 10a is a flowchart illustrating a repayment management method, according to a preferred embodiment of the present invention.

Figure 11:
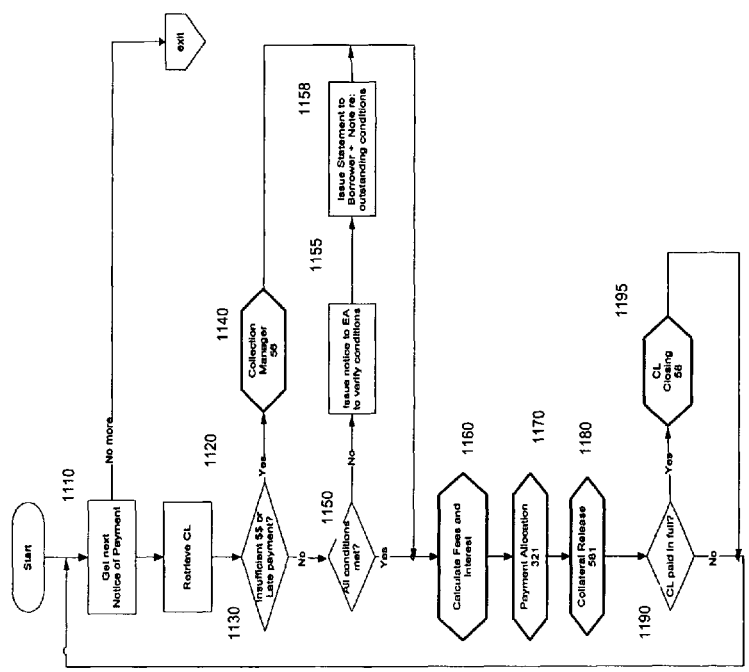

FIG. 11 is a flowchart illustrating a repayment management method based on notices from escrow agents or banks, according to a preferred embodiment of the present invention.

Figure 11A:
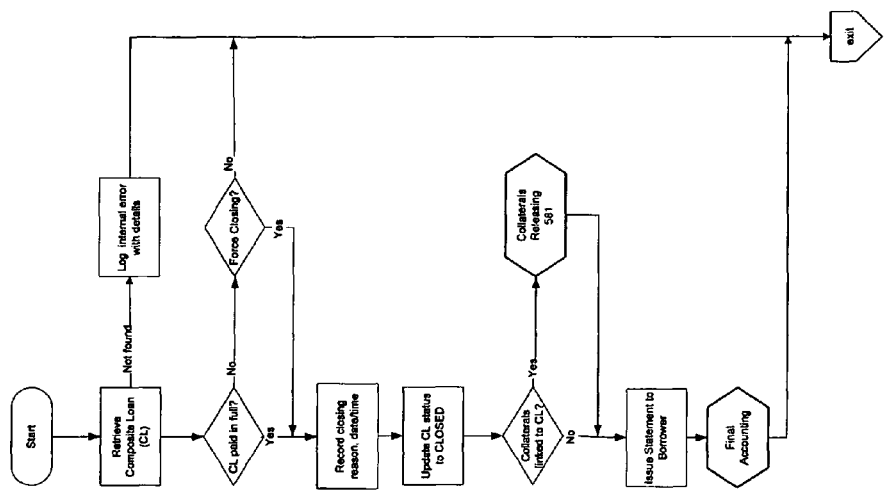

FIG. 11a is a flowchart illustrating a loan closing method, according to a preferred embodiment of the present invention.

Figure 11B:
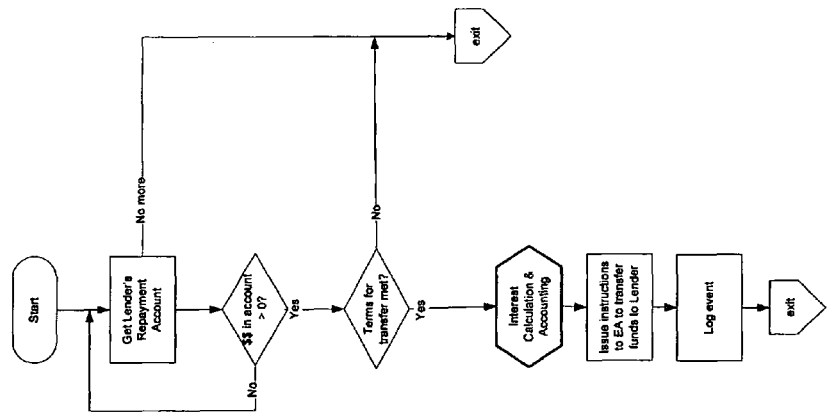

FIG. 11b is a flowchart illustrating a lender payment dispensing method, according to a preferred embodiment of the present invention.

DESCRIPTION OF THE PREFERRED EMBODIMENTS

The present embodiments comprise an apparatus and a method for generating and processing lending and borrowing orders and for managing a flexible loan market that is preferably networked and allows participants to act as borrowers and lenders. As explained, the loan market manages loans throughout their lifetime from inception to completion of repayment. That is to say it manages the matching of borrowers to lenders at the start. It manages transfer of the loan from lender to lender and it manages repayment and default.

Preferred embodiments of the present invention relate to facilitating and managing a method for concurrent direct lending and borrowing transactions through a risk aware exchange. More particularly, a preferred embodiment of the present invention introduces a method for generating clusters of atomic loans that together match the risk profile and rates desired by lenders and acceptable to borrowers. A preferred embodiment of the present invention provides a method for managing the life cycle of clusters of atomic loans by directing and coordinating multiple independent qualified service providers, as explained in further detail herein below.

A preferred embodiment of the present invention may be implemented as a workflow, handling a variety of transactions and operations: a request for external verification, waiting for external event, etc.

Figure 1A:
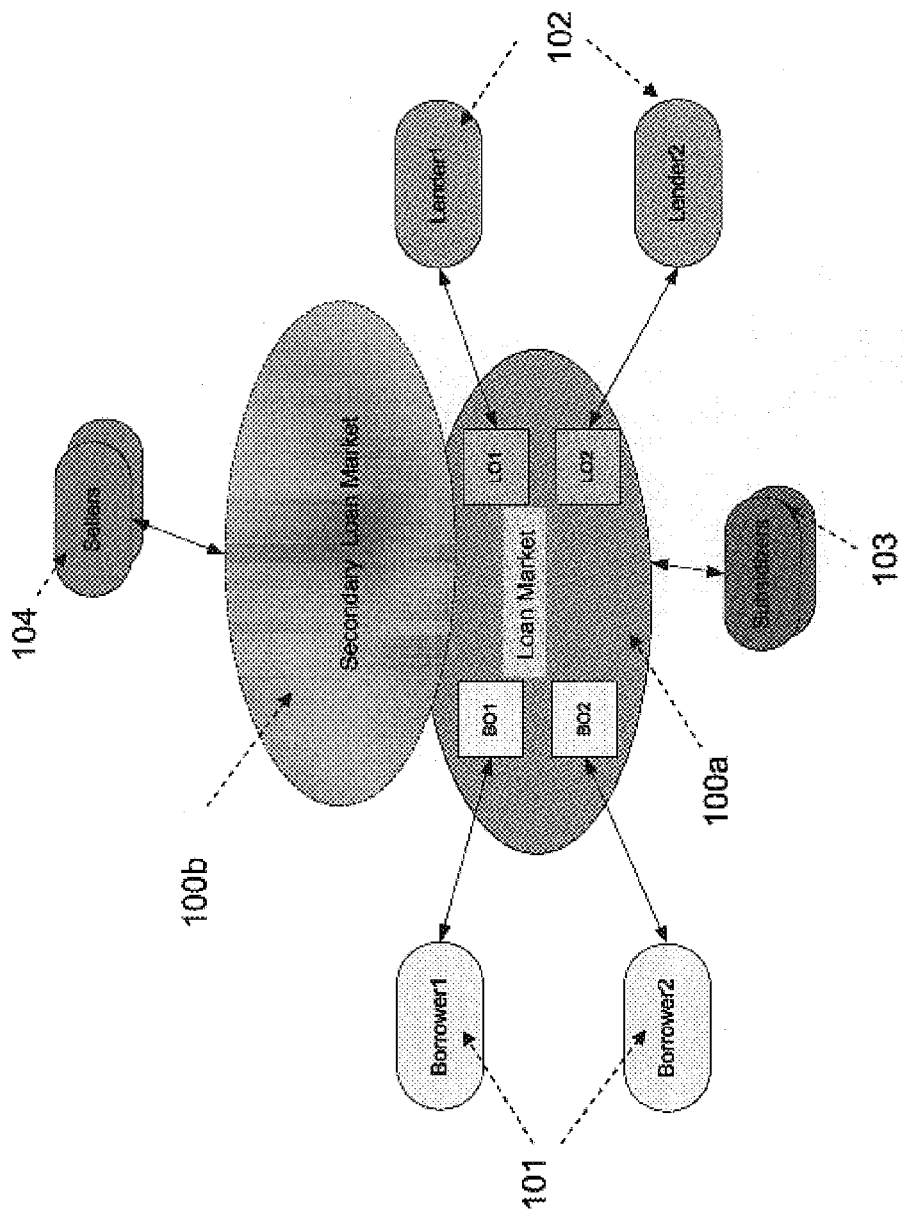

Reference is now made to FIG. 1a, which is a block diagram schematically illustrating a loan market implementing an apparatus according to a preferred embodiment of the present invention.

An apparatus according to preferred embodiments of the present invention may be used by organizations, irrespective of whether they provide banking services in general, for supporting the actual execution of the loans through fund transfer Optionally, the actual transfer of funds from the lender(s) 102 to the borrower(s) 101 and from the borrower(s) to the lender(s) (repayment) may be carried out by escrow agents communicated to by the apparatus with appropriate money transfer requests. That is to say, the actual transfer of money may be carried out by escrow agents rather than banks. The lender pays the escrow agent who transfers the money to the borrower(s). Money transfer by the escrow agents is described in greater detail herein below.

The present embodiments attempt at providing an optimized match between lenders 102 and borrowers 101 and a solution which is appropriate for lending to private customers or micro-lending.

Preferred embodiments of the present invention may allow replacing banks in general and handling of loans of any type or magnitude, not necessarily between private customers or micro-lending Preferred embodiments of the present invention provide an apparatus for managing a loan market 100a, as described in further detail herein below. Optionally, the loan market is implemented as a part of a web site, such that Internet users may communicate with the apparatus for posting borrowing orders, lending orders, etc, as described in further detail herein below.

In a loan market managed using an apparatus according to preferred embodiments of the present invention, lenders 102 may offer to lend funding, using lending orders LO1, LO2. A lending order (LO) defines general lending terms proposed by a certain lender 102 for finding a loan. The lending terms are not specific with respect to a certain borrower, but rather define general terms the lender is willing to lend under.

The lending terms may include, but are not limited to: the amount to be lent, the target risk the lender is willing to assume, the type of algorithm used to calculate the risk taken and the specific parameters used in such algorithm, (including the type and amount of collaterals, the geographic location of the borrower, the use of the funds, the business type of the borrower, the financial condition of the borrower, the desired period(s) (or alternative periods), the minimum interest rates, and any other term associated with each acceptable set of parameters).

Similarly, borrowers 101 may express their wish to borrow, using borrowing orders BO1, BO2. A borrowing order (BO) is used to specify borrowing terms. A borrowing order defines general borrowing terms proposed by a certain borrower 101. The borrowing terms are not specific with respect to a certain lender, but rather define general terms the borrower is willing to borrow under, as described in greater detail herein below.

Then, a matching process is carried out, where a set of matches is provided, where a lending order is matched with borrowing orders, such that the lending order and the borrowing orders are mutually satisfied, as described in further detail herein below.

Preferably, there may also be subsidizers 103, such as a government agency, a municipality, commercial entities that want to promote their products and/or services (for example a car dealer that subsidizes loans for new cars), etc. Subsidizers may participate in the loan market 100a, subsidizing certain loans, according to subsidizing terms defined by the subsidizers 103, as described in further detail herein below.

Preferably, an apparatus according to a preferred embodiment also supports a secondary loan market 100b.

In the secondary loan market 100b, a lender 102 may put his position in a certain loan for sale, and another lender may buy the position, as described in further detail herein below. Furthermore, a lender from the secondary loan market 100b may act as a seller 104. The seller (lender) 104 offers his position in a loan traded in the secondary loan market 100b for sale in the loan market 100a managed by the apparatus of the present invention's embodiment, as described in further detail herein below.

The secondary loan market is actually the same market in which existing loans are offered for sale by lenders who hold them and other lenders who buy the loans. That is to say, the buyer in a secondary trade is a lender who steps into the shoes of the original lender. In the eyes of the buyer (who is a lender), the atomic loan meets his criteria and he does not care (and may be doesn't know) that the loan originates from another lender.

The principles and operation of a method and an apparatus according to the present invention may be better understood with reference to the drawings and accompanying description.

Before explaining at least one embodiment of the invention in detail, it is to be understood that the invention is not limited in its application to the details of construction and the arrangement of the components set forth in the following description, or illustrated in the drawings. The invention is capable of other embodiments or of being practiced or carried out in various ways. Also, it is to be understood that the phraseology and terminology employed herein is for the purpose of description and should not be regarded as limiting.

Figure 1B:
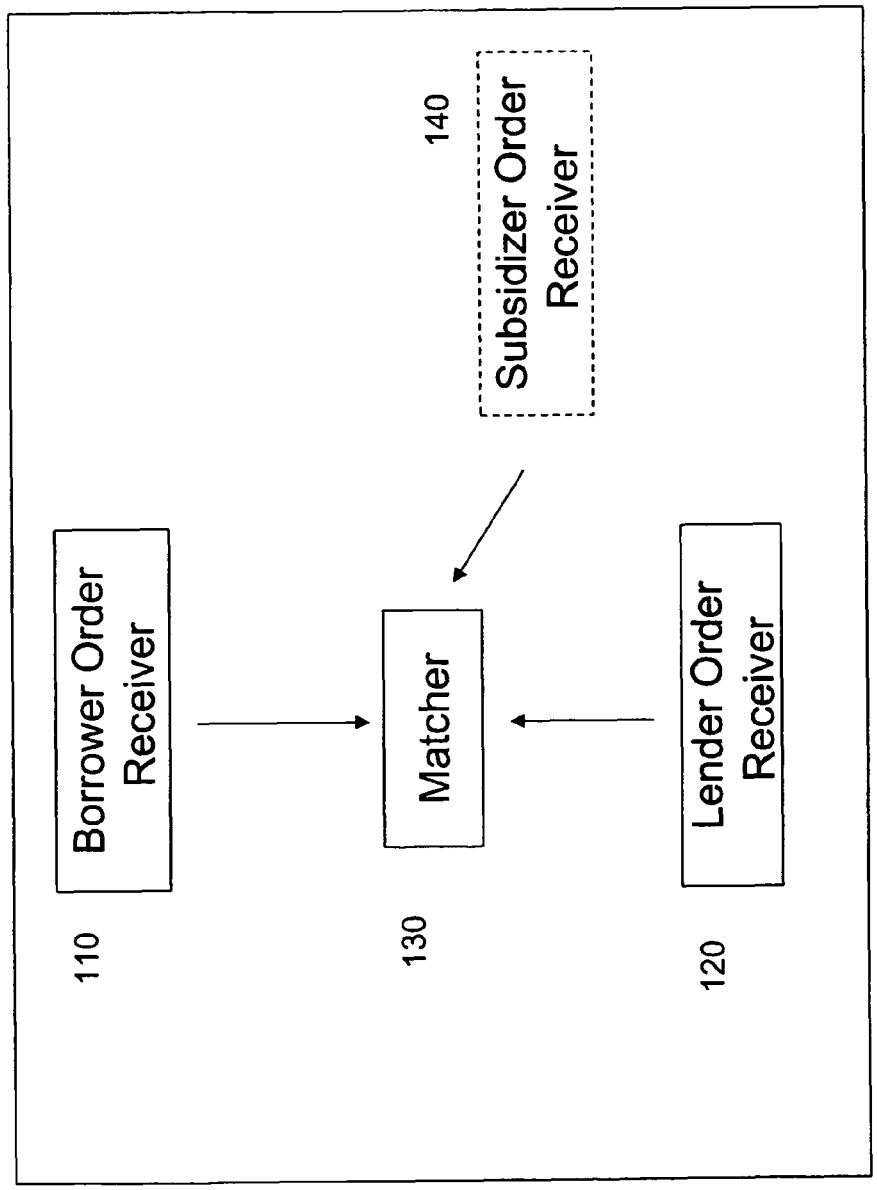

Reference is now made to FIG. 1b, which is a block diagram illustrating a first apparatus for generating and processing lending and borrowing orders, according to a preferred embodiment of the present invention.

Apparatus 1000 includes a borrowing order receiver 110. The borrowing order receiver 110 receives one or more borrowing order(s) in either an online mode or a batch mode. (for example, the orders may first be received by a business partner or an agent, and later input to the borrowing order receiver in a batch process).

Orders that are created (both lending orders and borrowing orders) are then stored in a database and processed by the matching system.

Optionally, the borrowing order receiver 110 communicates with one or more borrower(s) over a communication network, for receiving the borrowing order(s). Preferably, the borrowing order receiver 110 is implemented as a part of a web site, and communicates with the borrowers(s) over the Internet.

In each borrowing order, a borrower expresses his wish to borrow money. A borrowing order defines general loan borrowing terms proposed by a certain borrower. The loan borrowing terms are not specific with respect to a certain lender, but rather define general loan terms the borrower is willing to borrow under.

The loan borrowing terms in a borrowing order may include, but are not limited to: the maximum effective interest rate and fees the borrower is willing to pay, the borrower's desired period of the loan, the type of loan the borrower is interested in (say, a balloon loan having a single payment due upon maturity of debt), etc.

The borrowing order also includes information about the borrower himself, such as—the borrower's name, his address, his tax ID, his financial information, description of the borrower's business etc.

The borrower may also provide supporting information including available collaterals, or any other information that is usable for assisting the process of rating the risk of lending to the borrower.

Apparatus 1000 further includes a lending order receiver 120. The lending order receiver 120 receives one or more loan lending order from lender(s). Optionally, the lending order receiver 120 communicates with one or more lender(s) over a communication network, for receiving the lending order(s).

Preferably, the lending order receiver 120 is implemented as an interactive process over the Internet, and communicates with the lender(s) over the Internet.

A lending order defines general loan lending terms proposed by a certain lender for the funding. The loan lending terms are not specific with respect to a certain borrower, but rather define general loan terms the lender is willing to lend under.

The loan lending terms may include, but are not limited to: the amount to be lent, the target risk the lender is willing to assume, the type of algorithm used to calculate the risk taken and the specific parameters used in such an algorithm (including the type and amount of collaterals), the desired period(s) (or alternative periods), the minimum interest rates, and any other term. (e.g. required diversification), either within one loan or within the entire inventory of loans held by the lender, in terms of geography, industry, loan types, reluctance to lend to specific group of borrowers etc.

The apparatus 1000 further includes a matcher 130 which receives lending orders and borrowing orders from their respective repositories and processes them.

The matcher 130 automatically provides a match to a current lending order from amongst the borrowing orders, such that the matched orders are mutually satisfied with respect to the loan terms defined in the orders. The matcher may match many borrowers with each lender, so as to optimally diversify the risk associated with each portfolio loan, as described in further detail herein below.

The matcher 130 implements a matching method, as described herein below.

Preferably, the matching method is based on an optimization technique, as described in greater detail herein below.

For providing the match, the matcher 130 matches each lending order with a set of borrowing orders. The provided match translates into a loan funded by the lender who issues the lending order. The loan is preferably spread among multiple borrowers, as described in further detail herein below.

Preferably, the loan is matched with respect to the lending terms defined by the lender in the lending order and borrowing terms defined by the borrowers in their borrowing orders. Matching is optimized to satisfy a preset utility function.

Preferably, the optimization takes into consideration all orders pending in the cycle, yielding an optimized combination of resultant loans.

More preferably, the matcher 130 takes into consideration the risk associated with each Borrowing Order (BO) including the rating (if available) of each of the borrowers, the purpose of the loan, and any other available and relevant information, in choosing which borrowing orders to match with the lending order, such that the lending order is satisfied with respect to lender-requested risk terms defined in the lending order, as described in further detail herein below.

Thus from the perspective of the lender, the lender holds a portfolio loan, satisfying his lending order, as discussed in greater detail herein below. The portfolio loan is comprised of atomic loans, each representing a direct contractual agreement between one lender and one borrower.

Preferably, the borrowing orders matched with the lending order are selected by the matcher 130, so as to also satisfy the loan with respect to the borrowing terms defined by each of the borrowing orders. That is to say, from the perspective of the borrower, the borrower takes a composite loan satisfying the borrowing terms as specified in his borrowing order. The composite loan comprises atomic loans. Each atomic loan represents a direct contractual agreement between one lender and one borrower, as described hereinabove, but it is handled as a part of the composite loan for borrower's convenience.

For example, a borrower may wish to borrow $1200 and pay it off in equal monthly payments, and issues a borrowing order bearing such loan terms. The borrower may take out a single atomic loan at 5% interest and pay back $100 plus interest each month. Alternatively he may take a composite loan split such that $500 are borrowed from the first lender at 5% interest, $200 from a second lender who is prepared to lend at 2% for a whole year, and $500 from a third lender who charges 3% for a six months loan.

Preferably, the apparatus 1000 further includes a secondary sale manager, for receiving a sale order from a first lender offering to sell his position as a lender in a loan, and a buying order from a second lender willing to buy the share of the first lender in the loan.

The secondary sale manager handles various aspects of the sale, and updates data pertaining to the loans in databases of the apparatus 1000. Using the secondary sale manager, lenders may offer to sell their positions in one or more atomic loans or portfolio loans.

The sale order is used by a lender to express his will to offer a selection of his active loan(s) for sale. The lender may specify criteria for selection of active loans from his loan portfolio, or may specifically identify certain loans for offering, etc.

Optionally, the buying order is not received directly from a lender, but is rather derived automatically from an original lending order, by the secondary sale manager. The original lending order belongs to a lender who expresses his indifference with regards to the question whether the buying order derived from his lending order is satisfied by a primary loan, or through trading a loan in secondary sale.

Preferably, the apparatus 1000 further includes a subsidizer order receiver 140, connected with the matcher 130.

The subsidizer order receiver 110 receives one or more subsidizing order(s) from loan subsidizers. For example, a government agency may function as a loan subsidizer for students, low income earners, etc. In another example, a car dealer may offer subsidy for a specific make or model, in various forms, such as assuming the payment of interest on the loan, reducing the borrower obligation to repay by paying the first payment, etc.

In the subsidizing order, the subsidizer may define subsidizer loan terms for loans he wishes to subsidize. The subsidizer loan terms may include but are not limited to: a profile of borrowers (students, low income earners, certain minority groups, etc), the level of subsidizing (covering part of the interest rate, providing part of the loaned sum of money at preferred rate or terms, whether the amounts payable by the subsidizer are paid up front or over the term of the loan, etc.), other loan terms, etc.

Preferably, apparatus 1000 further includes a report generator.

The report generator may include a variety of reporting tools, and provide an operator of the apparatus 1000 with reporting services. The reports may also be provided to other users of the apparatus. The reporting services may include but are not limited to: statistical analyses of orders, reports for auditing, tax reports, calculated indexes (For example—normal interest rates in currently traded loans in a loan market managed by the apparatus 1000), etc.

Preferably, apparatus 1000 also includes an external loan market interface manager. The external loan market interface manager manages communication between the apparatus 1000, and an external-apparatus managing a loan market external to a loan market managed by the apparatus 1000.

The interface managed by the external loan market interface manager supports processes between the two loan markets.

The processes supported by the interface may include, but are not limited to: posting lending and borrowing orders on the external loan market, receiving lending and borrowing orders from the external loan market, receiving existing loan data from the external loan market (for trading lender positions in the loans existing in the external market in the loan market managed by the apparatus 1000), and sending existing loan data to the external loan market (for trading lender positions in loans existing in the loan market managed by the apparatus 1000 in the external loan market).

The processes may further include registering matching data pertaining to orders sent the external market and matched by the external-apparatus to orders in the external loan market, emulating users of the external-apparatus (lenders, borrowers, service providers, etc.)—to allow users of the apparatus 1000 to communicate with them, registering service providers of the external loan market by the apparatus 1000, etc.

Preferably, the external loan market interface manager manages interfaces to multiple external-apparatuses. Each of the external apparatuses manages a loan market external to a loan market managed by the apparatus 1000.

Preferably, apparatus 1000 also includes a loan profile receiver, for receiving a one or more loan profile(s) from a user. The loan profile comprises default loan terms, to be used as default loan terms for an order received from a borrower or a lender providing the loan profile. The profile may be specific to a certain user (lender, borrower, subsidizer, etc.), specific to a group of users, or general.

Figure 1C:
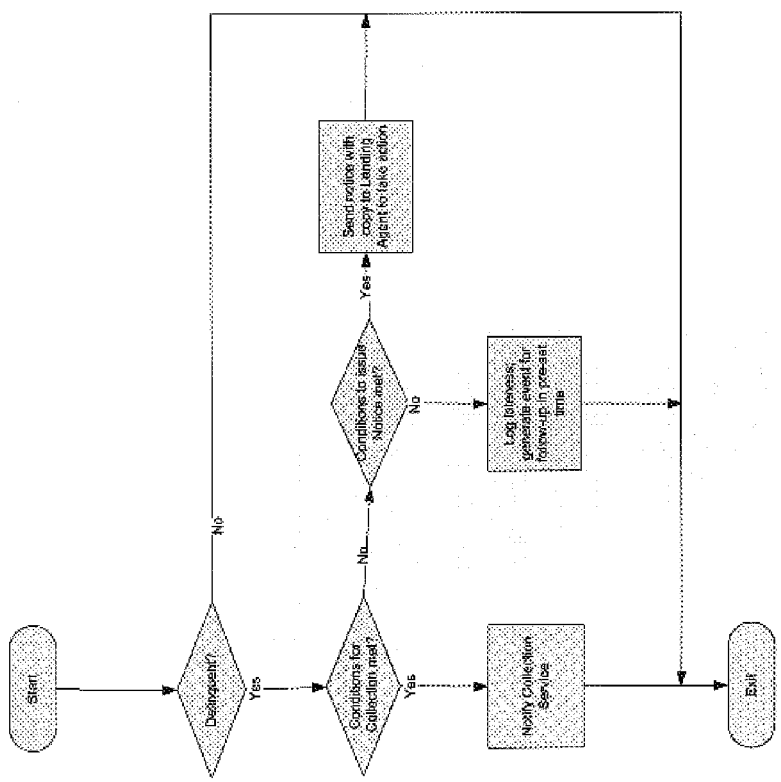

Preferably, apparatus 1000 also includes a collection manager, for managing the processes related to debt collection. An exemplary debt collection process as carried out by a collection manager according to a preferred embodiment of the present invention is provided in FIG. 1*c*.

Preferably, the apparatus 1000 also handles a variety of additional processes including but not limited to: collateral management, external verification management, etc, as described in further detail herein below.

Figure 2:
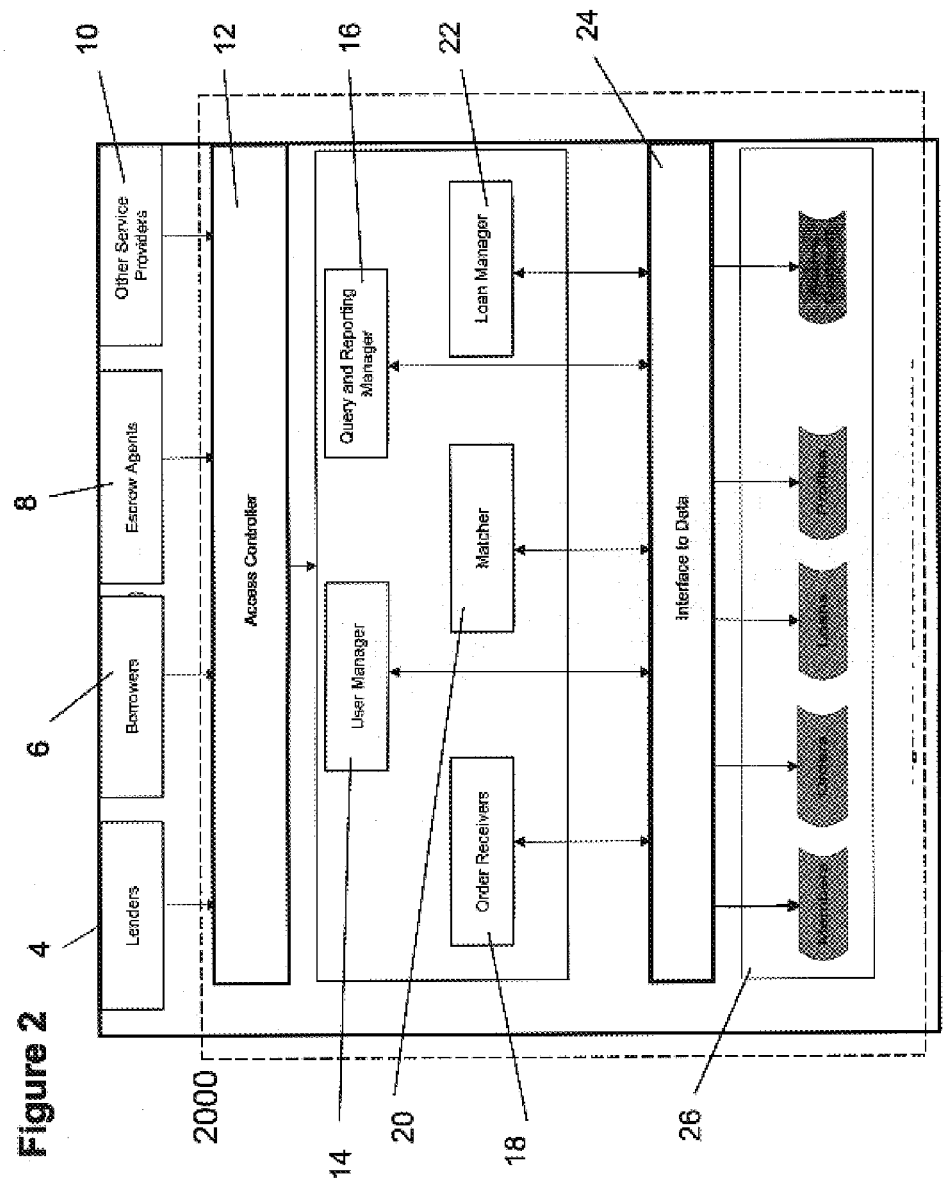

Reference is now made to FIG. 2, which is a block diagram illustrating a second apparatus for generating and processing lending and borrowing orders, according to a preferred embodiment of the present invention.

Apparatus 2000 includes an access controller 12, for controlling the access of users—lenders 4, borrowers 6, escrow agents 8, other service providers 10, or any other users, to the apparatus 2000.

Optionally, the access controller 12 checks the user's ID and password.

Preferably, if the user is recognized and the password is correct, the controller 12 may use a predefined user-profile to prompt the user for additional forms of authentication such as a physical token, a user key, or any other form of authentication, as defined by the operator of the apparatus 2000. Access to certain sensitive functions provided by the apparatus 2000 may require additional measures of authentication. The additional measures are performed by the controller 12 upon the attempt to exercise the sensitive functions.

Apparatus 2000 further includes a user manager 14 connected to the access controller 12.

The user manager 14 handles the management functions that involve users of all types including: lenders, borrowers, or occasional authorized users. The management of users may include, but is not limited to: user registration, fees, subscription handling, definition of user access profiles and authorizations, etc, as described in further detail herein below.

Apparatus 2000 further includes a query and reporting manager 16.

The query and reporting manager 16 provides query and reporting services to the operator of the apparatus 2000. The query and reporting manager 16 produces statistical analyses on requests, offers and fulfillments.

The query and reporting manager 16 also produces various reports and forms for audit and tax purposes. Reports may be generated as a routine activity, as part of the auditing procedure, etc. The reports may be stored on magnetic media, to be retrieved and viewed upon request (say as timed snapshots). The query and reporting services provided by the query and reporting manager 16 are discussed in further detail herein below.

Apparatus 2000 further includes order receivers 18, connected to the access controller 12. The order receivers 18 include the borrowing order receiver 110—for receiving borrowing orders and the lending order receiver 120—for receiving lending orders, as described for apparatus 1000 hereinabove.

Apparatus 2000 further includes a matcher 20.

The matcher 20 automatically provides a match to current lending orders from amongst the borrowing orders, such that the matched orders are mutually satisfied with respect to the loan terms defined in the orders.

For providing the match, the matcher 20 matches each lending order with a set of borrowing orders. The loan funded by the lender who issues the lending order is spread among multiple borrowers.

As discussed hereinabove above, the loan is matched with respect to the lending terms defined by the lender in the lending order and borrowing terms defined by borrowers in their borrowing orders. The optimization in the matching process is based on a utility function that dictates the goal of the optimization as described in detail herein below.

From the perspective of the lender, the lender holds a portfolio loan, satisfying the lender loan terms defined in his lending order, as discussed in greater detail herein below. Each of the loans in the portfolio loan is an atomic loan. An atomic loan represents a direct contractual agreement between one lender and one borrower.

Preferably, the borrowing orders matched with the lending order are selected by the matcher 20, so as to yield an optimized combinations of atomic loans with respect to the utility function defined by an authorized user.

From the perspective of the borrower, the borrower receives a composite loan satisfying the borrowing terms as specified in his borrowing order. The composite loan comprises atomic loans. Each atomic loan represents a direct contractual agreement between one lender and one borrower, as described hereinabove.

The matcher 20 may utilize different types of algorithms with varying degrees of complexity, for providing the match, as described in greater detail herein below.

Apparatus 2000 further includes a loan manager 22. The loan manager 22 handles inter alia the actual execution of the atomic loans and the composite loans (say, using escrow agents), as described in further detail herein below.

Preferably, the loan manager 22 also includes a workflow engine, which handles the various events and transactions involved in the life cycle of the atomic loans and the composite loans. The events and actions include but are not limited to initiating, executing, and collecting a loan resultant upon the matching described hereinbelow.

Apparatus 2000 further includes one or more database(s) 26, for storing information relating to users of services provided by the apparatus 2000 (lenders, borrowers, escrow agents, and others), to borrowing orders, to lending orders, to loans, to user profiles, to active content—such as up to date market trend analysis, quotes, etc.

The apparatus 2000 further includes an interface to data 24. The interface to data 24 controls access to information stored in the database 26. The interface to data 24 controls both authorization of access and physical access (i.e., physical distribution of data records in the data bases 26, Web Services, servers, etc.). Optionally, the databases 26 are arranged as several different data stores for storing, updating and retrieving data on users, orders, loans, etc. Each data store may have an audit trail (i.e., log) of changes made to the database.

For example, the orders data store may be separated into several different data stores, one for logging every borrowing order, a second for logging every lending order, and a third for maintaining all loan profiles used by the users of the apparatus 2000. A loan profile is used by a lender to define the kind of loan he wishes to give. A loan profile may be defined at the user level, at a group level, thus applying to orders placed by a lender or a borrower who belongs to the group, or at a general level, usable by any lender or borrower.

Figure 2A:
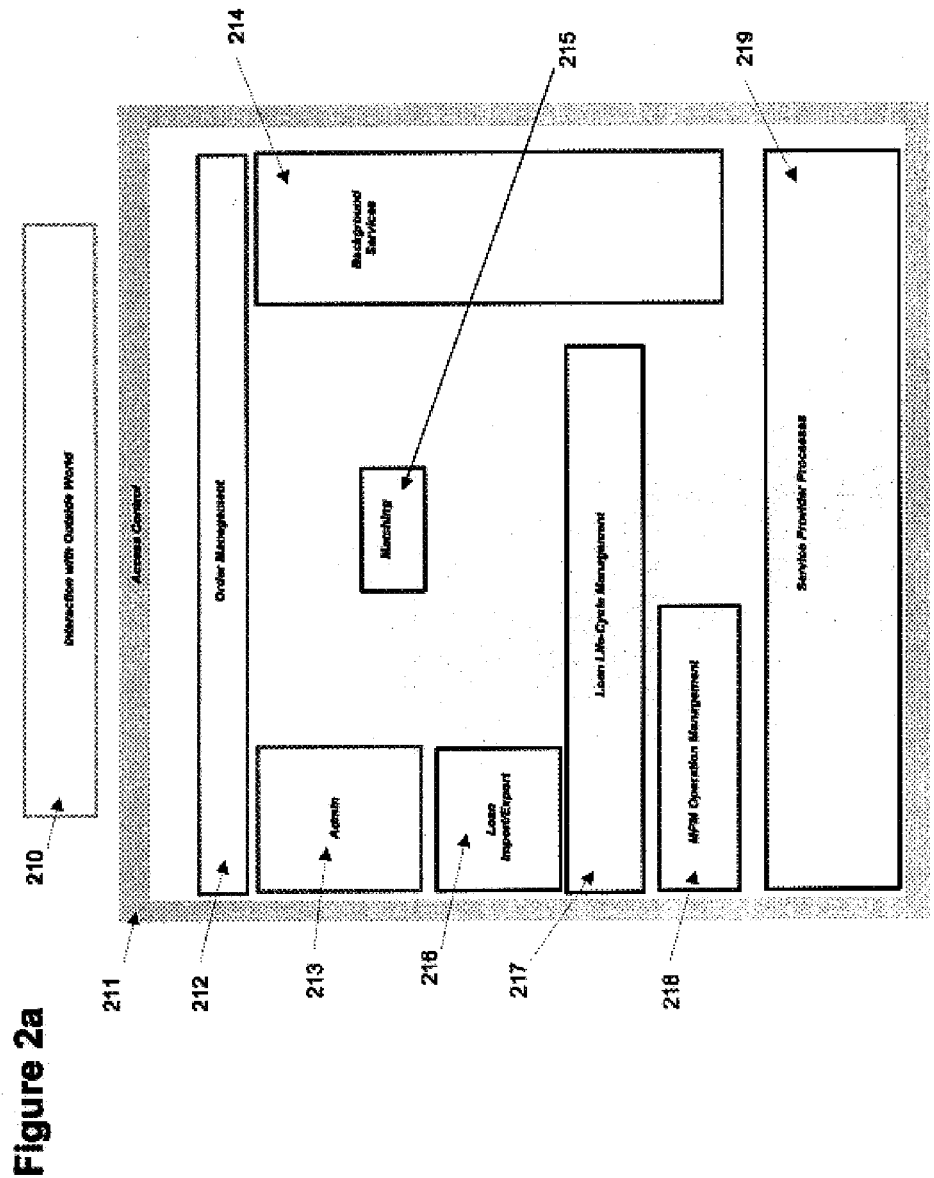

Reference is now made to FIG. 2a, which is a block diagram mapping processes carried out by an apparatus for loan market management, according to a preferred embodiment of the present invention.

An apparatus according to a preferred embodiment of the present invention implements processes for interaction with the outside world 210 (say, for managing the interaction with other loan markets), access control process 211—say, for controlling the access of users to data pertaining to the loans, order management 212 processes, administration 213 processes, background service 214 processes, matching 215 processes—for proving an optimized match amongst borrower's and lender's orders, loan import/export 216 processes, loan life cycle management 217 processes, market operation 218 processes, and service provider 219 processes.

Figure 2B:
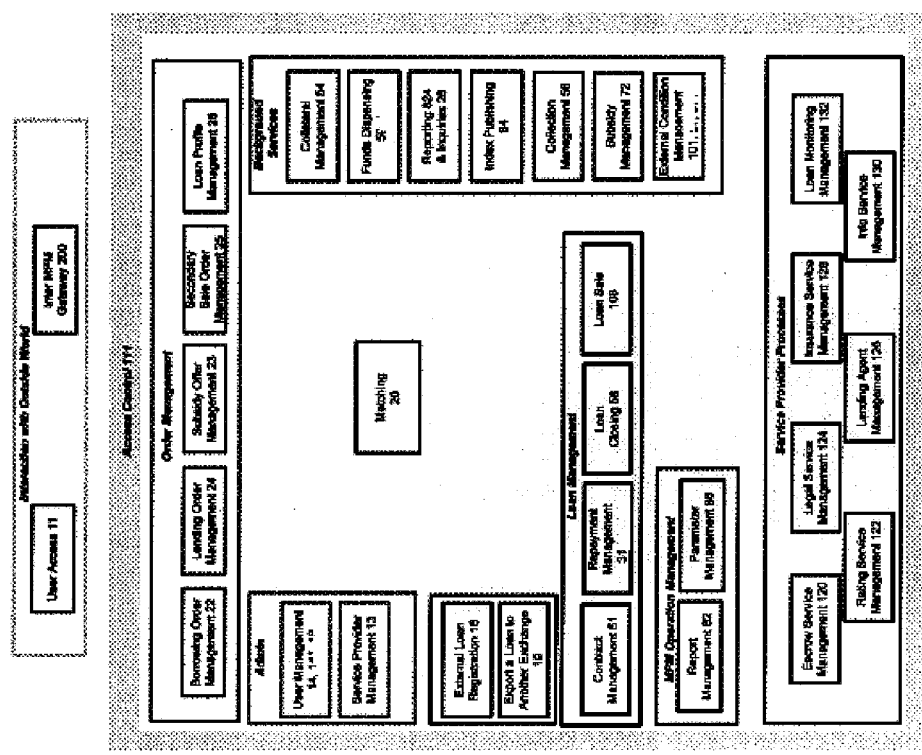

Reference is now made to FIG. 2b which is a second block diagram mapping processes carried out by an apparatus for loan market management, in further detail, according to a preferred embodiment of the present invention.

In an apparatus according to a preferred embodiment of the present invention, the processes for interaction with the outside world may include user access management 11, and use a gateway 200 for connecting two or more loan markets.

The apparatus may implement processes for finding a match 20 between borrowing orders and lending orders, as described in further detail herein below.

The apparatus may also implement order management processes: borrowing order management 22, lending order management 24, subsidy order management 23, secondary sale order management 25, and loan profile management 28, as described in further detail herein below.

Optionally, the apparatus may further implement administration processes: user management 14, service provider management 13, etc., as described in further detail herein below.

The apparatus may also implement loan export/import processes including but not limited to: external loan registration 18, and exporting loans to another loan market 19.

Preferably, the apparatus may implement loan management processes, including but not limited to: contract management 51, payment management 31, loan closing 58, and loan sale 108.

The apparatus may also carry out processes for operating the loan market, including but not limited to: report management 82 processes (for defining and generating reports relating to the loans, to the borrowers and lenders, etc.), market parameter management 86 processes, etc.

Preferably, the apparatus also implements background processes, which are activated by various events in the loan management, or initiated based on a pre-set cycle: collateral management 54, fund dispensing 59, reporting & queries 26, index publishing 84, collection management 56, subsidy management 72, external condition management 101, etc., as described in further detail herein below.

Preferably, the apparatus further implements service provider processes, including but not limited to: escrow service management 120, rating services 122, legal service management 124, lending agent management 126, insurance service management 128, information service management 130, loan monitoring management 132, etc., as described in further detail herein below.

Figure 3:
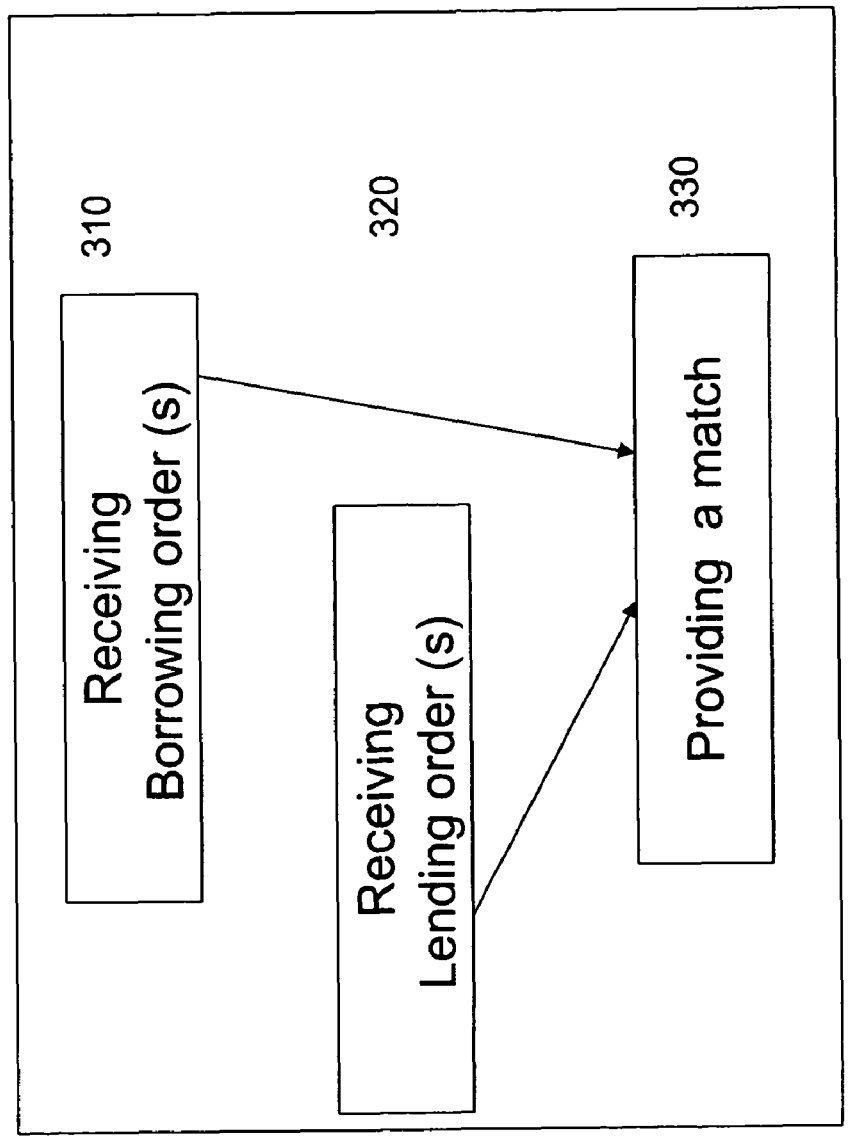

Reference is now made to FIG. 3, which is a flowchart illustrating a first method for generating and processing lending and borrowing orders, according to a preferred embodiment of the present invention.

In a method 3000 according to a preferred embodiment, a borrowing order is received 310 from a borrower In each borrowing order, a borrower expresses his will to borrow money, and defines his requested borrowing loan terms.

A borrowing order defines general borrowing loan terms proposed by a certain borrower. The borrowing loan terms are not specific with respect to a certain lender, but rather define general loan terms the borrower agrees to borrow under. The borrowing loan terms in a borrowing order may include, but are not limited to: the maximum effective interest rate and fees the borrower agrees to pay, the borrower's desired period of the loan, etc., as discussed hereinabove.

The borrower may also provide supporting information including available collaterals, insurance, and other information that may be usable for assisting the process of rating the risk of lending to the borrower, etc.

Method 3000 further includes receiving 320 a lending order from a lender. A lending order defines general loan lending terms proposed by a certain lender for the funding. The loan lending terms are not specific with respect to a certain borrower, but rather define general loan terms the lender wishes to lend under. However, the terms may include conditions related to certain characteristics pertaining to borrowers, such as type of business or industry they are active in, geographic region, etc.

The loan lending terms may include, but are not limited to: the amount to be lent, the target risk the lender agrees to assume, the type of algorithm used by the lender to calculate his risk and the specific parameters used in such algorithm, (including the type and amount of collaterals), the desired period(s) (or alternative periods), the minimum interest rates, and any other term associated with each acceptable set of parameters, etc.

Finally, there is automatically provided 330 a match to a current lending order from amongst the borrowing orders, such that the matched orders are mutually satisfied with respect to the loan terms, say using a matcher 130, as described in greater detail hereinabove.

In the provided match, the lending order is matched with a set of borrowing orders. The loan funded by the lender who issued the lending order is spread among multiple borrowers.

Thus from the perspective of the lender, the lender holds a portfolio loan, satisfying his lending order, as discussed in greater detail herein below. Each of the loans in the portfolio loan is an atomic loan. An atomic loan represents a direct contractual agreement between one lender and one borrower.

That is to say, from the perspective of the borrower, the borrower receives a composite loan satisfying the borrowing terms as specified in his borrowing order. The composite loan comprises atomic loans. Each atomic loan represents a direct contractual agreement between one lender and one borrower, as described in further detail herein below.

Optionally, the method may also include receiving one or more subsidizer order(s) from subsidizer(s), such as a government agency, or a commercial organization. In the subsidizer order, the subsidizer may define the loan terms for loans he wishes to subsidize. The loan terms may include but are not limited to: a profile of borrowers (students, low income earners, etc.), the level of subsidizing (as a part of the interest rate, as a part of the loaned sum of money, etc.), other loan terms, etc.

In the matching process, the borrowing order may be matched with subsidizer order(s) in addition to lending order(s), as described herein above.

Optionally, the method 3000 further includes a step of executing the loans satisfying the lending order.

The execution of the loans may include generating legal documents for atomic loans, issuing instructions for transferring money to a borrower according a composite loan, issuing instructions for transferring money from a lender according to a portfolio loan, etc.

Preferably, the instructions for transferring money between users (lenders, borrowers, etc.) are forwarded to an escrow agent for transferring the money, as described in greater detail herein below. That is to say, the method 3000 may be implemented by an entity which does not hold the funds transferred among lenders borrowers service providers and other parties.

Figure 4:
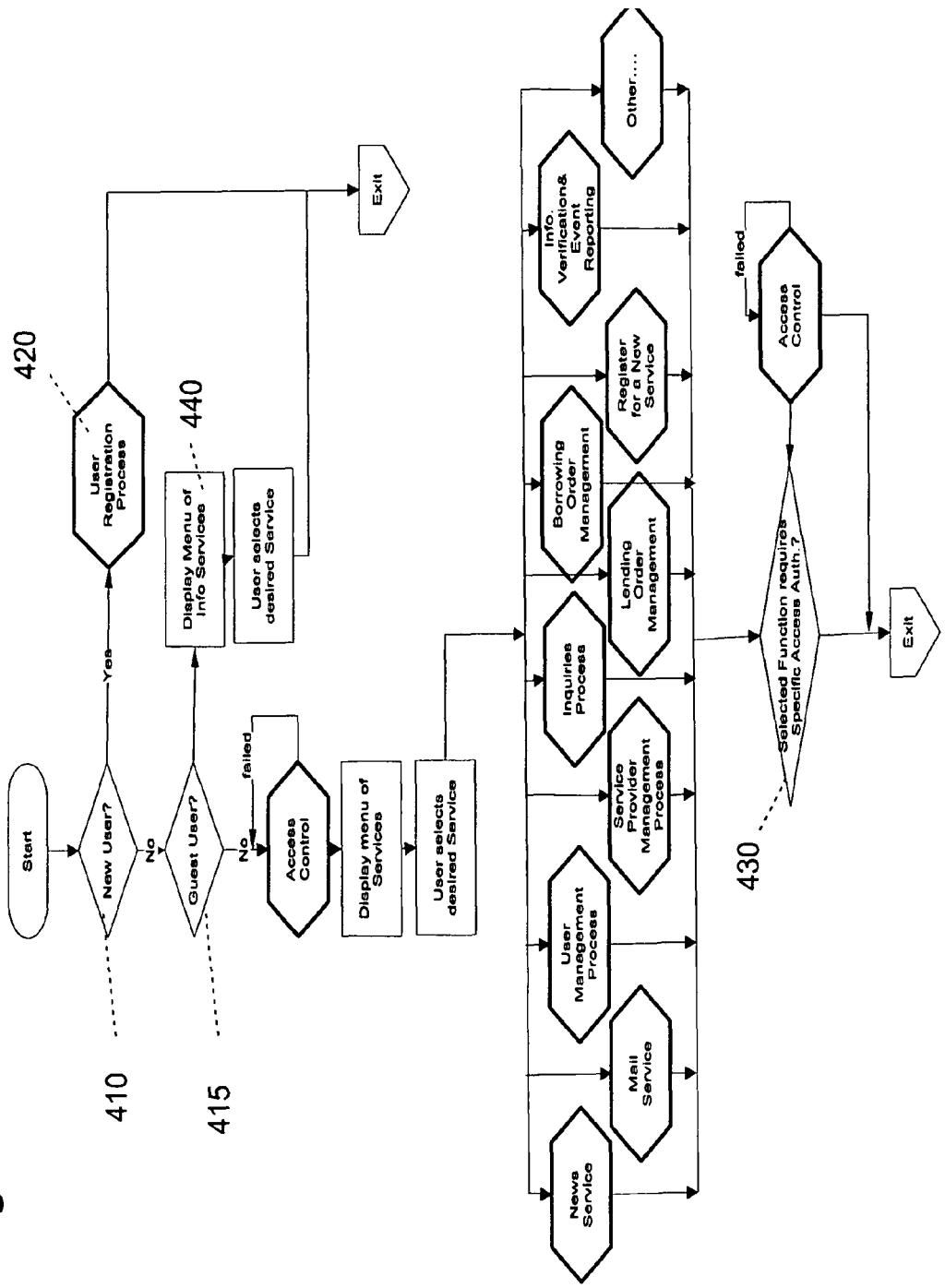

Reference is now made to FIG. 4, which is a flowchart illustrating a method for handling user interactions, according to a preferred embodiment of the present invention.

Preferably, a method according to a preferred embodiment of the present invention may further include handling user interactions with the apparatus 1000.

The identity of the user is verified. If the user is a new user 410, the user is directed to a user registration process 420.

The user is presented a menu of functions, to select the function the user wishes to access. Once the user selects the function, there may be carried out another level of access control, for example—in case of sensitive functions 430. For example, if the user is a guest user 415, he may be presented an appropriately customized menu 440, containing only those functions accessible to guests.

Preferably, the ID and password of the user are checked. Based on a predefined profile assigned to the user, the user is prompted to additional forms of authentication such as physical token or a user key, as known in the art, where required. Access to certain functions may require additional measures of authentication, as described hereinabove.

Figure 4A:
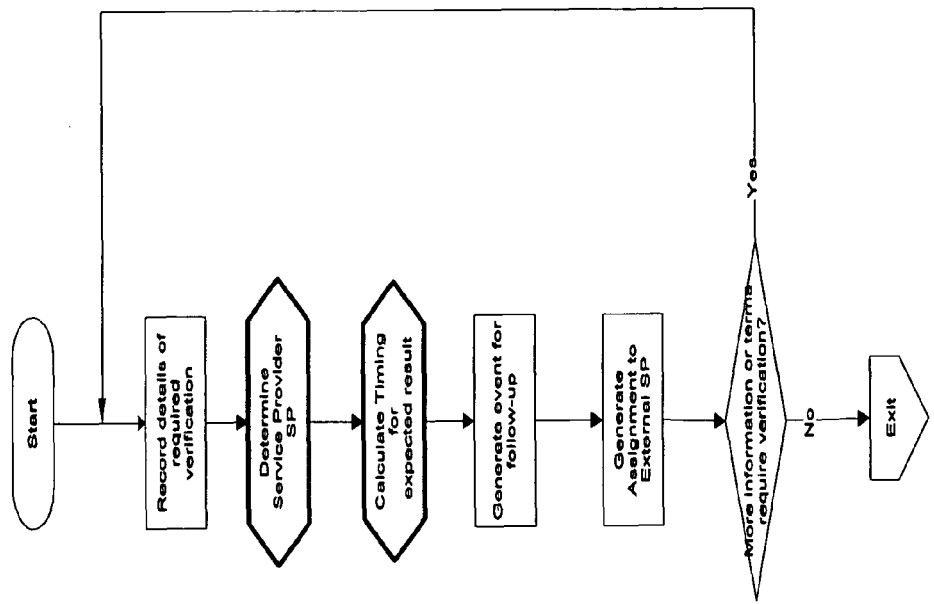

Preferably, the method for handling user interactions implements external conditions verification, as illustrated in FIG. 4*a*.

Reference is now made to FIG. 5, which is a flowchart a method for illustrating user management, according to a preferred embodiment of the present invention.

A method according to a preferred embodiment handles all the management functions that involve users of all types including, but not limited to: lenders, borrowers, service providers, occasional authorized users, etc. The user management functions include but are not limited to: user registration 510, fees and subscription handling, definition of access profiles and authorizations, collecting of other information related to the user, etc.

All updates to user data are subject to a user information assessment 560, which checks impact of the changes on the user's status, rating (specifically—risk rating), loans in process, as well as any other known information.

Specific attention is given to rating, carried out by a user's rating assessment process 560. Any change in user data is checked for its possible effect on the user's rating, which indicates the risk involved in lending to the user, such as introduction of new collaterals, change of address to a neighborhood that is considered risky, etc. as illustrated in FIG. 5*a*.

The user may be ranked according to information provided by one or more rating service(s), such as Dan & Bradstreet™, etc.

Optionally, the user information assessment 560 is followed by external verification 520. In the external verification, external verification service providers, such as a loan agent or a rating service, provide additional information which bear relevance to the user when borrowing or lending a loan.

A change in a user's rating may affect outstanding loans (i.e. lent, currently in re-payment) as well as pending loans (i.e., requested, not yet matched), as described in further detail hereinabove. Based on the user information assessment 560, automatic events may be generated, say by the apparatus 1000, described hereinabove.

According to a preferred embodiment, the method for user management also includes a process for managing user collaterals as illustrated in FIG. 5*b*.

For example, collaterals available to a user may be a part of the information stored 540 for the user. The available collaterals information is used for allocating collaterals to loans. The collaterals may be associated to a borrowing order (570) or to a composite loan (580).

Preferably, each new user and visiting user to the apparatus 1000 undergoes a registration process. Each user is granted a user name, a user type, credentials, one or more forms of authentication (from a single password, through a multi-stage authentication that may include a hardware device with built-in credentials, etc.).

The registration process may require presenting specific documents to a trusted user that authenticates the documents and reports the successful authentication to the apparatus 1000 (e.g., a certificate of good standing).

Preferably, the registration is a multi stage process, in which the apparatus 1000 accumulates information about the registering user, records the information in a database, provides the registering user with selective access to the database, allows other (specific) users to provide or be provided with information about the user, and monitors the registration until it is successfully completed, or abandoned.

Optionally, the registration process includes a rating process. The rating process is invoked to initiate a request for an external rating service. The rating service may be selected according to geography, industry, etc. The information may be provided by the external rating service provider in a batch mode, in an on-line mode, or both.

In some cases, the system may provide a conditional or a provisional registration for either lenders or borrowers.

For example, the user may be allowed to start using the system but blocked from completing a transaction until required conditions are met. The user may apply for a loan and participate in the borrowing process but not receive the money until authenticating himself to a user providing a user authentication service.

In one exemplary provisional registration, a user is allowed to start lending or borrowing a loan. However, a transaction for ordering the money transfer to the user's account, or from the user account is not completed before the user physically signs an umbrella contract in front of a certain user who is a signature guarantor. The signature guarantor checks the signed contract and reports the signing to the apparatus 1000.

Preferably, a method according to a preferred embodiment may include a service provider registration process resembling the user registration described hereinabove.

The service provider registration process may be carried out in multiple stages. The service provider registration process includes, but is not limited to: checking the user's fulfillment of predefined requirements, verification and authentication of certification data, professional exams, etc.

The service provider registration process renders the applicant legally or professionally capable of providing his services.

The service provider is allowed to update only those data elements he is authorized to modify. Preferably, following the update, the apparatus 1000 performs a service provider (SP) information assessment process.

In the SP information assessment process the update is checked with respect to potential impacts on authorization or certification. Optionally, there are generated certain events to handle situations where such potential impacts exist. For example, there may be automatically generated predefined notification to certain authorized users upon the detection of the existence of the potential impacts. The notification may be general or specific to certain loans the service provider is involved in, say as a borrower rating provider.

Reference is now made to FIG. 6a, which is a flowchart illustrating a method for borrowing order receiving and management, according to a preferred embodiment of the present invention.

According to a preferred embodiment, borrowing order receiving and management starts from the interaction of a borrower with the apparatus 1000. The borrower enters specifications for desired loan borrowing terms, in a borrowing order, as described in further detail hereinabove.

Optionally, borrowing orders may also be entered in a batch process, where the data of the loan is provided from an external system.

Optionally, the borrowing terms are based on a previously stored borrowing profile 221, and may be modified for a specific order.

Optionally, the user may provide collateral for the loan, in which case, a collateral update process is invoked for updating 541 the database with the collaterals.

The borrowing order (BO) is characterized by a set of parameters, including but not limited to: a borrower's identity (ID)—a unique identifier of the borrower, through which his relevant characteristics (e.g., contact details, account number, tax payer ID, rating, etc.) may be obtained, price—the maximum effective or absolute price (i.e., interest rate) which the borrower wishes to borrow at, amount—the maximal or/and minimal sums of money that the borrower wishes to borrow (by specifying both the borrower indicates his willingness to get partial fulfillment), the currency of the loan, the period for which the loan is requested (start date and end date), and repayment—repayment terms that the borrower wants (for example, the borrower may request to repay in one lump sum at the end of the period, or make a series of periodical payments).

The borrowing order (BO) may also be categorized by other parameters: Prepayment Options—whether preliminary payment is allowed, when is prepayment allowed, prepayment penalty, etc, collaterals data—details of collaterals offered by the borrower, insurance—whether or not the borrower wishes to buy insurance for the loan to improve the rating, amount, conditions, etc, the purpose of the loan—say a student's loan which may be subsidized, as described hereinabove, subsidy reference—if the requested loan is tied to an open subsidizing order, signature—an electronic signature that is considered binding, (though may not suffice for specific loans, such a loan exceeding a predefined amount, or in certain jurisdictions), whether the borrower allows the loan to be posted in a secondary loan market As part of the borrowing order (BO) entry, a relevant subsidy request (as specified by the borrower) is checked. Eligibility or relevance is verified, either electronically or through a lending agent.

There is also handled a priority among the predefined various order profiles, stored in a loan profile directory, as follows: user defined profiles, group defined (based on user's characteristics), and lastly—general profiles. The user selects the one appropriate for the current loan order, or—he may prefer to start from scratch, in which case he can still save the new loan profile for future use. A separate process may be used for handling updates to the loan profile directly.

According to a preferred embodiment, subsidizers are allowed to post their unique offering in a subsidizer order, say utilizing a subsidizer order receiver, as described hereinabove.

The subsidizer order describes loan subsidizing terms, including but not limited to: the method of subsidy offered, a method of verifying the borrower's entitlement for the subsidy offered, a period in which the offer is available, a set of specific conditions (say, the size of the loan, jurisdiction, personal history, type of transaction, any specific requirement of the lender), a method of calculating the amount or percent of subsidy, the method of paying for the subsidy, a total amount of cash covered by the specific subsidy offer, etc.

Optionally, based on the profile or the amount involved in the subsidizer order, certain subsidizer orders may be routed to a particular agent. The agent checks the details of the offer and has the subsidizer sign an appropriate subsidy schedule to be added to a subsidizer's agreement, before the subsidy order is released and becomes active.

Reference is now made to FIG. 6b, which is a flowchart illustrating a method for signature verification, according to a preferred embodiment of the present invention.

A method according to a preferred embodiment further handles signature entry for borrowing orders, lending orders, or any other transaction. Various types of signatures may be entered, such as Notary authorized signatures, Electronic Signatures, Biometric signatures, Natural signatures, etc, as known in the art.

In a signature verification method, in accordance with a preferred embodiment of the present invention, if the apparatus 1000 or a specific lender 602 requires a manual signature, the signature may be verified 603 by a third party.

A demand event for verification of a signature is generated 604. Next, there is determined a designated lending agent (by region, industry, etc.) 605, and the lending agent is notified about the event 606.

Reference is now made to FIG. 7, which is a flowchart illustrating a method for lending order receiving and management, according to a preferred embodiment of the present invention.

A system administrator or an authorized system user defines the general and the group type profiles. The lending terms may be stored in a lending loan profile for a specific lender. The lending terms are default lending terms, presented 24 to the specific lender, whenever the lender places a lending order, as default terms for the lending order A lending order may include, but is not limited to the following: an identifier of the lender, a price—a minimum effective or absolute interest rate the lender agrees to lend at, maximal and minimal (range) sums of money that the lender wishes to lend, currency, minimal and maximal time period for the lender's proposal, and repayment mode and terms that the lender requests (linear, zero coupon, balloon payment, minimum increment amount to receive, etc).

The lending order may further include special conditions, such as: whether the lender prefers to lend over a period of time or in one payment, maximum number of loans cut from the entire amount offered, states/regions of the borrowers, whether or not insurance is required for the loan and details relating to the insurance, whether prepayment is allowed and under what conditions or penalties, etc.

The lending order may also include signature requirements defining specifics of requirement for a manual signature verification, tied to a formulated condition (e.g., amount), or non-conditional.

The lending order received from the lender is recorded in a database. Upon providing a matching to lending order, as described in further detail hereinabove, the lending order is marked as fulfilled. Preferably, data pertaining to the lending order may be used for historical statistical analysis, archived, etc.

Preferably, when a lender enters a lending order, the lender is presented with default lending terms from a pre-stored profile. The presented terms are fetched according to a priority starting with lender specific lending terms stored in a lender specific loan profile.

When there is no loan profile specific to the lender, or the lender specific loan profile fails to provide a default value to certain loan term (say, the range of interest rates), the apparatus 1000 may search for a loan profile defined for a group of lenders that the lender belong to. Finally, the default value may be fetched from a general loan profile.

When the lender is presented the default lending terms according to existing loan profiles, he may choose to override certain terms with new values for the specific lending order. The lender may also be allowed to update or define lender specific lending terms, in a lender specific loan profile, as described hereinabove.

Reference is now made to FIG. 8 which is a flowchart illustrating a method for managing a secondary loan sale, according to a preferred embodiment of the present invention.

A method according to a preferred embodiment includes a process allowing a lender to act as a seller offering a selection of his active loans for sale. The process described herein below, may be carried out by a secondary sale manager, as described hereinabove.

The lender may specify 810 criteria for selection of active loans from his active loans, that he is interested in putting his position at for sale. The lender is presented 820 a list of loans from his loan portfolio. Each loan in the presented list meets the criteria.

Then, the lender may choose 830 from the list one or more specific loan(s) he wishes to put for sale. If one of the loans put for sale by the lender is not assignable 840, say as a result of certain conditions imposed by a subsidizer of the specific loan which is put for sale, a rejection is issued 850 and reported to the lender.

Next, the lender may specify 860 various sale terms, to be recorded in a sale order for the loan. The sale terms may include but are not limited to: the price, the transaction type, the percentage of the position being offered for sale, or any other conditions.

Finally, the terms defined by the lender are saved in the secondary sale order, and a second lender may decide to buy the position, using the secondary sale manager, as described in further detail hereinabove. The resale may be done in the Matching: the offered loan for resale is handled as a borrowing order, and any lender's order (LO) may be matched with it (unless the "buying" lender specified his wish not to buy a sold loan.)

The second lender may issue a buying order defining his terms for buying a position in an existing loan.

Alternatively, a buying order is rather automatically derived from a lending order of the second lender, by the secondary sale manager. Optionally there may be provided that the second lender agrees that his lending order be fulfilled in a secondary market, say as an indication in a user profile stored for the second lender.

A Method for Providing a Match

The matcher 130 matches each lending order with multiple borrowing orders and visa versa, distributing the risk.

As described herein bellow, the matching process results in composite loans made of a sets of atomic loans from multiple lenders to a single borrower; and corresponding portfolio loans made of sets of atomic loans from a single lender to multiple borrowers.

Reference is now made to FIG. 9a which is a block diagram illustrating an exemplary composite loan and portfolio loan, according to a preferred embodiment of the present invention.

The effective characteristics (interest rates, amounts, time, repayment schedules, risk profile, etc.) of the composite loan are derived from the characteristics of each of the atomic loans. The interest rate of the composite loan is the weighted average of the interest rates of the underlying atomic loans multiplied by each atomic loan's percentage.

For example, if the composite loan of $1000 is a combination of a $600 loan at 3% interest and an additional $400 at 4% interest, then the composite loan of $1000 bears (3%*600+ 4%*400)/1000=3.4% interest rate.

The amount of the composite loan 910 is the sum of the amounts of all the atomic loans 901 of which it is composed. The time period of a composite loan is the union of the time periods of the atomic loans 901 of which it is composed. The repayment schedule of a composite loan is a union of the repayment schedules of the underlying atomic loans 901.

A composite loan 910 can be made of atomic loans 901 with different re-payment schedules and different methods and priorities in allocating specific payments among the underlying atomic loans.

Once we have generated a set of composite loans 910 to satisfy a set of borrowing orders and lending orders, we can look at all of the atomic loans 902 associated with a single lending order as a portfolio loan 920

The risk associated with this portfolio loan 920 may be calculated from the respective risks (ratings) of each of the borrowers associated with the portfolio loan 920 and the correlations between them.

In essence, a portfolio loan can be looked upon as a virtual investment portfolio. The risk of the portfolio loan 920 can be calculated using—for instance—the risk calculations of Modern Portfolio Theory (MPT). Therefore, if we have two atomic loans 902 given by a lender L to borrowers B1 and B2, the risk associated with the portfolio loan 920 is calculated in one possible implementation as follows:

$$R_{12}=\sqrt{w_1^2 R_1^2 + w_2^2 R_2^2 + 2w_1 w_2 R_1 R_2 \rho_{12}}$$

Where $w_1$, $w_2$ represent the weights associated with each of the two loans, respectively, and $w_1+w_2=1$, and $\rho_{12}$ is the correlation coefficient between the two borrowers. The formula for the risk of a portfolio loan $R_P$ composed of more than two borrowers can be generalized using the MPT principles:

$$R_P = \sqrt{\sum_i w_i^2 R_i^2 + \sum_i \sum_j w_i w_j R_i^2 R_j^2 \rho_{ij}^2}$$

Where:

$i \neq j$;

$$\sum_i w_i = 1$$

And $\rho_{ij}$ is the correlation coefficient between borrower i and j.

The correlation coefficient represents the direction and strength of the relationship between two borrowers, and takes on a value between −1 and +1. The sign of the correlation coefficient indicates the direction of the relationship: a positive sign indicates that there is a positive relationship between the borrowers, while a negative sign indicates that there is a negative relationship between the borrowers.

The strength of the relationship is indicated by the absolute value of the correlation coefficient: the closer the number is to 1 the stronger the relationship, while the closer the number is to 0 the weaker the relationship. A generalization of the idea of the correlation coefficient may be as follows:

$\rho=1$—means that there is an exact positive relationship between the two borrowers, i.e. if one defaults on the loan repayment so does the other and vice versa.

$\rho=0$—means that there is no relationship between the two borrowers.

$\rho=-1$—means that there is an exact negative relationship between the two borrowers, i.e. if one borrower repays the loan the other is sure to default and vice versa.

The correlation coefficient between two borrowers plays a major role in determining the effectiveness of diversifying the risk of a portfolio loan.

To determine the correlation between two atomic loans, one can use quantitative methods based on the loan histories of the borrowers. If the loan histories are unavailable, one can use methods that try to quantify the qualitative relationship of the borrowers. For example, are they relatives, do they work for the same employer, do they live in the same geography, etc.

Borrowers and lenders have different goals. Borrowers typically wish to borrow money at the lowest possible interest rate, while lenders wish to lend money for the highest return at a specified risk level.

According to a preferred embodiment of the present invention, the match provided by the matcher 130 is optimized with respect to one or more criteria. The criterion(s) may be defined by an operator of the apparatus 1000.

Preferably, the matcher 130 has to carry out a method including a constrained optimization process aimed at satisfying a set of criteria defined by the operator of the apparatus as the utility function, as described in further detail herein below.

The optimization process involves finding a match amongst each lending order and respective borrowing orders, such that the found matches yield the best result as indicated by the criteria defined by the operator. The found matches further satisfy constraints as defined by borrowers and lenders under the loan terms (i.e., level of risk, time period, etc), as defined in their respective borrower requests and loan orders.

Theoretically, at each point in time, the matching process generates for each outstanding borrowing order $BO_i$, the set of all possible composite loans $CL_j(BO_i)$ combinations that can satisfy the borrower's loan terms.

After doing so for all outstanding borrowing orders, the intermediate result is a set of all of the possible composite loan combinations $CL_{ij}$ that can satisfy all of the outstanding borrowing orders.

The next step in the matching process is the selection of a subset $CL_{ij}$ of the composite loans that optimizes the Matching Utility Function, defined herein below such that for each borrowing order $BO_i$ at most, one composite loan is selected, and that the subset of composite loans can co-exist.

The set of all possible composite loans that satisfy a single borrowing order can be infinite. For example, if the borrower requests a loan of $1000, the set may theoretically be composed of an infinite number of lender/amount combinations.

To reduce the complexity of the matching process, the apparatus 1000 may define a limited number of values for each of the borrowing/lending order dimensions. For example, the period possibilities can include: 3-months, 6-months, 1-year, 2-years, . . . 10 years. Likewise the rating (risk) scale can be divided into {very high, high, medium, low, very low}. The finite set of loan specifications, greatly reduces the number of composite loans that match a single borrowing order.

Preferably, a user of the apparatus 1000 may be allowed to configure the Matching Utility Function within matcher 130, to be optimized through the constrained optimization process. The user may define the Matching Utility Function and the parameters the function uses.

The utility function expresses the goal of the matching process. A higher utility function score expresses a better match, and is thus preferable.

Borrowers desire to borrow money at the lowest cost (interest rate, commissions) available that complies with their other requirements (amount, time, repayment schedule) as defined in their borrowing order(s).

Lenders, on the other hand, want to lend money for the highest return at a specified maximum level of risk that complies with their other requirements (amount, time, repayment schedule) as defined in their lending order(s).

The operator of the apparatus 1000 wishes to generate the highest volume of loans, to maximize his profit from transaction fees, and to maintain a maximum level of customer satisfaction. For example, if only one of two identical borrowing orders can be satisfied, typically the one that is outstanding the longest is selected, all else being equal, so as to shorten the averaged waiting time for borrowers.

The utility function is a user configurable function of the total volume, return, risk and customer satisfaction index of the set of composite loans that satisfies a match. Optionally, the utility function is such that: The higher the volume of loans generated—the higher the utility score, the lower the interest paid by borrowers—the higher the utility score, the higher the return generated for lenders—the higher the utility score, the higher the risk level—the lower the utility score, the higher the customer satisfaction index—the higher the utility score.

The goals of borrowers and lenders are of opposite nature, i.e., borrowers want to borrow at the lowest cost, whereas lenders want to lend at the highest rate for the specified risk level.

For example, let us assume lender L wants to lend money with interest of at least 4%, and borrower B wants to borrow money at a cost (interest rate) of at most 6%. Assuming all other parameters support a match, the loan between B and L could be executed with interest anywhere in the range of 4% to 6%.

The nature of the Matching Utility Function determines the exact value of the loan. A fair utility function may minimize the difference of the actual loan from the desired (minimum/maximum) levels of interest sought after by the lender and borrower, as defined by their respective orders.

Preferably, an operator of the apparatus 1000 may be allowed to configure the matcher 130 with the Matching Utility Function, as described hereinabove. For example, the operator may configure the matcher 130 with a Matching Utility Function having the general scheme:

$$U = w_1 \text{Volume} + w_2 \frac{\text{Return}}{\text{Risk}} + w_3 CSI.$$

In the exemplary utility function, $w_1$, $w_2$, and $w_3$ denote the relative weight assigned by the operator to the volume of orders, the return/risk ration, and the customer satisfaction index (CSI), respectively.

The customer satisfaction index (CSI) quantifies the service level that the transacting parties (borrowers and lenders) experience. The CSI takes into account the amount of time an order is outstanding, previous orders that are not fulfilled (and their distance from market rates), and so forth.

The matching process may be implemented utilizing different types of algorithms with varying degrees of complexity. Ideally, one may want to select an algorithm that generates the optimal match in the shortest time. However, the multi-dimensional matching problem at hand is complex in nature. Therefore, in reality, the algorithms used may be sub-optimal on the one hand, but fast enough on the other.

Optionally, the matching problem at hand is formulated as follows.

Let $\{BO_1, \ldots, BO_N\}$ denote pending borrowing orders, and $\{LO_1, \ldots, LO_M\}$ denote pending lending orders.

Each borrowing order (BO) represents a tuple $BO_i=BO_i(a, p, \overline{v})$, and each lending order LO represents a tuple $LO_i=LO_i(a, r, \overline{v})$, where:

$BO_i(a)$—represents the amount of the borrowing order, typically a range $[a_{min}, a_{max}]$ indicating the minimum and maximum amounts;

$BO_i(p)$—represents the price (interest rate) of a borrowing order;

$BO_i(r)$—represents the risk of the borrowing order;

$BO_i(\overline{v})$ represents the remaining terms of the borrowing order;

$LO_i(a)$—represents the amount of the lending order, typically a range $[a_{min}, a_{max}]$ indicating the minimum and maximum amounts;

$LO_i(p)$—represents the price (interest rate) of the lending order;

$LO_i(r)$—represents the risk allowed by the lending order; and $LO_i(\overline{v})$—represents remaining terms of the lending order.

To facilitate the matching process, a matrix $CL_{ij}$ is used. The matrix has N rows and M columns, where each cell is a tuple $CL_{ij}=(m, a)$ where $$CL_{ij}(m) = \begin{cases} 1 & \text{if } BO_i \text{ matches } LO_j \\ 0 & \text{if } BO_i \text{ does not match } LO_j \end{cases}$$

and $CL_{ij}(a)$ designates the amount allocated from a lending order $LO_j$ to a borrowing order $BO_i$.

At each moment of time, during the optimization process, the first phase of the matching process is to traverse the matrix and initialize each cell $CL_{ij}(m)$ to bit values (0/1). Each bit value indicates whether there is a potential match between borrowing terms defined by borrowing order $BO_i$ and lending order $LO_j$.

Preferably, rather than recalculating each cell (bit value) in the matrix in each cycle of the optimization process, the cells corresponding to matched orders are removed and cells corresponding to new borrower and lending orders are added to the matrix.

That is to say, the matching process becomes a continuous multi cyclic optimization process where matched orders are removed from the matrix and new orders are added to the matrix through each cycle, as described hereinabove. In each cycle, there is found an optimized match between pending borrowing orders and lending orders. However, some of the orders may be left unmatched, and passed on to the next cycle.

Optionally, the matching algorithm may maximize $$\sum_j \frac{Return(LO_j(a))}{Risk(LO_j(a))},$$

such that:
$\forall j \ a_{min} \leq LO_j(a) \leq a_{max}$
$\forall i \ a_{min} \leq BO_i(a) \leq a_{max}$
$\forall j \ Risk(LO_j(a)) \leq LO_j(r)$ Where:

$$Return(LO_j(a)) = \sum_i CL_{ij}(m) \times CL_{ij}(a)$$

$$Risk(LO_j(a)) = \sqrt{\sum_i CL_{ij}^2(a) BO_i^2(r) CL_{ij}(m) + \sum_i \sum_k CL_{ij}(a) CL_{kj}(a) r_{ik}(j) CL_{ij}(m) CL_{kj}(m)}$$

$r_{ik}(j) = BO_i(r) BO_j(r) \rho_{ik}$ (where $\rho_{ik}$ denotes the correlation between borrowing orders $BO_i$ and $BO_k$.

That is to say, the matching problem is therefore a constrained optimization problem that can now be solved using various optimization techniques (e.g.: quadratic programming, simulated annealing, etc).

In theory the multi-dimensional cube that the matching algorithm has to search through to find the optimal match can be extremely large, along multiple dimensions and allowing an infinite range of continuous values for each attribute.

To simplify the matching process and reduce the complexity, we can limit some of the attribute values to a small finite set of discrete values, constituting discrete ranges of values, each range used for one of the attributes. For example, the risk values can be confined to a finite set of five values {very high—VH, high—H, medium—M, low—L, very low—VL}, the period values can be confined to {1 month, 3 months, 12 months, X years} and so forth.

Furthermore, in practice, the price (interest rate) of a loan offer reflects the amount of risk the lender wishes to take. Typically, the higher is the accepted risk, the higher the price (rate) becomes. To further simplify the matching process the pending offers are divided into a few different markets that reflect the prices (rates) requested. By reducing the set of possible values, the matching algorithm is limited to searching for matches in the same market $\{BO_i\}$s.

By relaxing attempts to find an optimal solution and rather looking for a feasible solution that can be computed quickly enough, a possible implementation may be reached, say using the following "Greedy" algorithm.

The "Greedy" algorithm attempts to allocate each borrowing order evenly between X lenders.

The algorithm is described herein below, using the above notation.

Row $CL_{0j}$ and column $CL_{i0}$ are added to the matrix, such that the matrix holds in the added row and column the temporary amounts allocated from the corresponding borrowing and lending orders.

The algorithm includes the following steps:

- Sort borrowing orders $\{BO_i\}$ according to risk;
- Sort lending orders $\{LO_j\}$ according to price (interest rate);
- For all i,j initialize $CL_{ij}(m)$ to the corresponding bit (0/1) values;
- For i = 1, . . . N do;
    For j = 0, . . . ,M do;
        $CL_{ij}(a) = 0$;
- For j = 1, . . . ,M do;
    $CL_{0j}(a) = 0$;

-continued

- For i = 1, . . . ,N do;
    For j = 1, . . . ,M do;
        If $(CL_{ij}(m) = 1$ AND $CL_{0j}(a) < LO_j(a)$ AND $CL_{i0}(a) < BO_i(a))$
        then do:
            $CL_{ij}(a) = CL_{ij}(a) + BO_i | X$
            $CL_{i0}(a) = CL_{i0}(a) + BO_i | X$
            $CL_{0j}(a) = CL_{0j}(a) + BO_i | X$
- For j = 1, . . . ,M do;
    If $Risk(LO_j(a)) > LO_j(r)$ then
        For i = 1, . . . N do;
            $CL_{i0}(a) = CL_{i0}(a) - CL_{ij}(a)$;
            $CL_{ij}(a) = 0$;
    For i = 1, . . . N do;
        If $CL_{i0}(a) < BO_i(a)$ then
            For j = 1, . . . ,M do;
                $CL_{0j}(a) = CL_{0j}(a) - CL_{ij}(a)$;
                $CL_{ij}(a) = 0$;

Following the full run of the algorithm, the remaining allocations $CL_{ij}(a)$ in the matrix can be used to generate loans that satisfy the matching constraints. After the loans are generated, their corresponding data is removed from the matrix and the algorithm is re-started again.

The algorithm ensures that borrowing orders are satisfied according to their risk level (borrowers with less risk satisfied first), that a borrower gets the cheapest loan available (subject to the Composite loans being distributed between 1/X lenders), and that a reasonable level of risk management is achieved.

Preferably, Subsidizer Orders are also handled by the matching process according to their limitations and considerations, as described hereinabove.

A method according to a preferred embodiment of the present invention allows the participation of service providers as described in further detail, including but not limited to the service providers described herein below.

Reference is now made to FIG. 9b, which is a flowchart illustrating a method for contract management of a composite loan, according to a preferred embodiment of the present invention.

The method of FIG. 9b utilizes a matrix resultant upon the matching method described hereinabove. In the matrix, each row represents one composite loan from multiple lenders to one borrower. The composite loan includes a group of atomic loans. The atomic loans are parsed and processed into atomic contracts. Each atomic contract contains the basic data pertaining to the atomic loan, such as—lender details, borrower details, amount, rate, period, conditions and payment terms.

For each composite loan, there is carried out a process of borrower rating 910, say using an external borrower rating service. If the rating of the borrower is not sufficient, the composite loan is rolled back 912, a log is updated with the roll back data 914 and the funds allocated to the loans (in lending orders) are released for further processing by the matching process described hereinabove.

Next, there is carried out a signature validation process 105, as illustrated hereinabove.

Next, each of the atomic loans in the composite loan is parsed 920, a loan contract is generated 930 for the atomic loan, and data pertaining to the loan contract is recorded 940.

Preferably, each loan contract is checked with respect to internal conditions. If the loan contract fails to meet the internal conditions, the loan contract is marked as unacceptable 950.

Preferably, each loan contract is also checked with respect to external conditions. Optionally, the loan contract may be marked as pending, until an external verification of conditioned is carried out 962.

For each loan there are further carried out collateral management processes 970, found transfer instruction processing 980 (say using escrow agents), and accumulation 990 of funds to be provided by the lender, as described in further detail hereinabove.

Preferably, there is managed a contract based on the composite loan, such that the atomic loans in the composite loan do not have to be exposed to the lender, as illustrated in FIG. 9b.

Once the matching process generates composite loans and the corresponding portfolio loans, a set of atomic loans is established between borrowers and lenders.

The apparatus 1000 instructs service providers to perform functions such as: reviewing financial info, verify and accept collaterals, review loans document with the borrower and obtain notarize signatures etc.

Once all conditions are met, the apparatus 1000 issues electronic funds transfer instructions to the escrow agents, to collect money from the lender's account and transfer funds to the borrower's account.

In most cases, a borrower gets one (or very few) transfers for the entire composite loan. Similarly, lenders see one or very few transfers for the entire amount of a portfolio loan. In most cases all funds are transferred to and from the account of an escrow agent, according to transfer.

Escrow Services

Escrow Services are provided by independent service providers who hold in trust funds that are flowing among lenders, borrowers and other service providers.

Reference is now made to FIG. 10 which is a block diagram illustrating interactions between escrow service providers and other parties in a loan market, according to a preferred embodiment of the present invention.

According to a preferred embodiment, escrow agents 101 interact with lenders 102 and borrowers 103, say for executing the transferring of funds between lenders and borrowers, etc, as described in further detail herein below.

The escrow agents 101 also interact with subsidizers 104 who transfer their share in principal or in interest of a subsidized loan handled by the escrow agents 101, sellers 105 who sell their positions in active loans, and third parties 106 having stakes in the loan process.

The escrow agents 101 receives instructions from the loan market 107, providing their services, for supporting various processes carried out in the loan market 107, and reports back to the loan market 107 about all funds received or paid for managed loans and related services.

Multiple escrow agents may participate in the borrowing and lending transactions, providing services to both borrowers and lenders, as well as to the service providers, and to the operator(s) of the apparatus 1000.

An escrow agent collects the funds, holds them in trust and transfers them, when due, to the receiving entities. Funds held by the escrow agent accumulate interest that is credited to the appropriate party. Every transaction performed by the escrow service may have a fee associated with it.

Preferably, there is defined a communication protocol between the apparatus 1000, and each escrow agent. The protocol may be used for: opening sub-accounts for new lenders, borrowers and service providers, providing advice about money expected to be received from lenders, providing advice about money expected to be received from borrowers, issuing instructions to transfer money to borrowers (say, either partial or complete loan amount), issuing instructions to transfer money to lenders (as money is collected from borrowers), issuing instructions to transfer money to service providers, etc.

Preferably, the protocol is also used for delivering reports from the escrow agent to the apparatus 1000. The reports may include, but are not limited to: money collected from lenders reports, moneys collected from borrowers reports, failing money transfer reports, computed and assessed fees reports, interest calculated periodically for each sub-account, etc.

The escrow agent may collect and dispense funds through any currently known method or service, including but not limited to: Automated Clearing House (ACH), wire services, charging a credit card, using person-to-person payment services such as PayPal, etc. The Escrow Agent can accept funds that were transferred by the payer or draw directly from the payer account using Automated Clearing House (ACH), or any other similar service(s).

Reference is now made to FIG. 10a, which is a flowchart illustrating a repayment management method, according to a preferred embodiment of the present invention.

According to a preferred embodiment of the present invention, there is provided a method for managing repayment of loans. The method includes monitoring the due payments according to a schedule of payments. The schedule of payments is derived from the composite loans resultant of the matching process, as described in further detail hereinabove.

First, an authorized user of the apparatus 1000 provides a date range for target payments 1010. Each active composite loan 1020 is examined 1030 with respect to having payments due within the date range.

If there is used an automatic withdrawal method 1040, there are generated a transaction for automatic electronic collection 1050 and a withdrawal advise to the borrower 1055.

If there isn't used automatic withdrawal, there are issued instructions 1060 to an escrow agent to expect fund transfer to be initiated by the borrower, and a statement is issued 1065 to the borrower.

If there are unpaid payments that are past their due payment date 1035, there is triggered a collection process, say by a collection manager 1056.

Reference is now made to FIG. 11, which is a flowchart illustrating a repayment management method based on notices from escrow agents or banks, according to a preferred embodiment of the present invention.

When there is input a notice of payment from a bank or from an escrow agent 1110, there is retrieved 1020 the data of the composite loan (CL) that the input notice of payment relates to. If the payment is late or insufficient 1130, a collection manager 1140 is triggered to initiate a collection process, for collecting the debt.

If not all conditions are met 1150, a notice is issued 1155 to the escrow agent, to verify conditions. Further, a statement is issued 1158 to the borrower which refers to the outstanding conditions.

Next, there are calculated fees and interest rates 1160, there is allocated a payment 1170 to the lender.

Next, relevant collaterals, used for the composite loan, are released 1180.

If the composite loan is fully paid 1190, the composite loan is closed 1195, as illustrated in FIG. 11a.

Optionally, there is used a method for instructing the escrow agent(s) to carry out fund dispensing to the borrower(s), as illustrated in the flowchart presented in FIG. 11b.

Rating Services

Rating services are provided by independent, authorized rating service providers.

A rating service provider is a third party offering borrower rating on a fee basis. Typically, the acceptance of the rating service provider as an authority is derived from its reputation. The rating service provider's credibility relies heavily on the thoroughness of its evaluation and verification of the subject entity it rates.

A method according to a preferred embodiment may further support the participation of other service providers in the loan trading business, including but not limited to: legal service providers, insurance services, external information providers, loan monitoring service providers (say, for monitoring the financial status of the borrower), etc.

Advantages of the Present Embodiments

The present embodiments may introduce advantages over current solutions. The advantages may include, but are not limited to the possible advantages described in the following paragraphs.

The system allows for a flexible loan market.

The system provides for such a flexible loan market that is open to borrowers and lenders large and small.

The flexibility of the loan market allows each user, whether acting as a borrower or a lender, to get the loan terms that best suit himself.

Efficiency and reduced costs—As described hereinabove, the apparatus 1000 may be operated by entities which are not banks. Consequently, there may be eliminated the requirement of capital reserves for operating a bank. There may be a significant reduction in the need for capital requirements involved in the operation of a bank, for example—there is no need to rent many offices, as a bank does for its branches. There may also be allowed competitive sourcing of many of the services related to the loan markets. As a result, there may be cut costs involving personnel, and there may be leveraged existing resources of other service providers, such as local realtors, accountants, mortgage brokers, lawyers, insurance agents, etc.

Optimal, customized, and multi-dimensional risk management—The apparatus 1000 may allow each lender to define his alternative customized loan profiles, based on an unlimited set of parameters. Such parameters may include, for instance: economic classifications of the borrower, the collaterals requested, the geographic location of the borrower, third party rating service providers the lender prefers to use and conditions imposed on the rating provided by the rating service providers, lender's exposure in other loans he already made, external markets data, commodity prices, exchange rates, weather condition information (say, when lending to a borrower in an hurricane prone geographical region), any other factor that may influence a lending decision. etc.

The lender may apply his risk assessment to each such profile, and set the price (interest rate) accordingly. The lender may also use the system to check the demand for loans in each profile, and decide which of few alternative sets of loan profile/price he is going to choose, based on his individual risk assessment, given such a granular and multi-dimensional ability to select borrowers, as taught in preferred embodiments of the present invention. However, the match is automatically generated, according to the criteria set by the lender(s) and borrower(s), as described in further detail hereinabove.

The methods introduced by the present invention aim at providing a way better than current methods. With current methods interest rates are based on a very few parameters mixed by a bank into a very broad average loss ratio.

The present embodiments may enable a lender to define and maintain his loan profiles in a very efficient way. Preferably, a lender is able to choose standard general profiles from a library, modify them as he wishes and store them as personalized lender specific profiles. Special calculators and management tools may also be provided, for allowing a lender to combine profiles. Other tools may provide standard assessment and pricing algorithms. The lender is able to enter his own parameters into general algorithms and use them to calculate his asked price, assess his risk involved, etc.

The present embodiments may further enable the lender to introduce flexible conditions, including external conditions, into a profile, or into a lending order, as described in further detail hereinabove. For example, a lending order issued by a car manufacturer may include an external condition that the overall sum the car manufacturer lends to a certain car buyer does not exceed a certain percentage of the price of the car, including discounts.

Global exposure—Utilizing the apparatus 1000 described hereinabove, there is provided a method to enable multiple entities (borrowers, lenders, etc), spread all over the globe, to participate in a global loan market comprising multiple smaller loan markets (say, when the apparatus 1000 is implemented as a part a web site). The global market where the multiple entities may act simultaneously creates liquidity and enhances exposure of lenders, borrowers, and service providers worldwide.

A multiplicity of focused loan markets—The apparatus 1000 may provide a method to enable cooperation between multiple focused loan markets, say using the external market interface manager. Each focus loan market is a loan market specializing in a certain sector of the economy. For example, there may be a loan market specializing in the energy sector where special aspects relating to the oil business sector, such as the price of a crude oil barrel (updated in real time) are addressed, etc.

Transparency—A system according to a preferred embodiment of the present invention is built in a way that enables (but not necessitates) the provision of transparency on a selective basis. The apparatus 1000 enables to document and show regulators and authorized parties the consistency and fairness of the matching process. The apparatus 1000 may also enable to provide confidentiality to borrowers and lender, so as to allow the borrowers and lenders to feel they receive a consistent and fair treatment.

Operations management is the system administrator—sets system parameters such as how often does it do matching, and provides reporting.

It is expected that during the life of this patent many relevant devices and systems will be developed and the scope of the terms herein, particularly of the terms "Internet", "web", and "Network", is intended to include all such new technologies a priori.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for generating and processing lending and borrowing orders in a networked loan market and lending management system, the apparatus comprising:
   a computer;
   a computer readable medium containing software;
   a borrowing order receiver, configured to receive, over a communication network, borrowing orders from at least one computing device operable by a borrower, each borrowing order comprising borrower-requested loan terms;
   a lending order receiver, configured to receive, over a communication network, lending orders from at least one computing device operable by a lender, each lending order comprising lender-requested loan terms; and
   a matcher, associated with said borrowing order receiver and said lending order receiver, and configured to automatically match borrowing orders and lending orders using a multi cyclic process that is optimized according to criteria of an operator-definable utility function, the matcher being further configured to provide said matches using a multi dimensional matrix of cells being populated according to said orders,
   wherein each cell of the matrix includes a first value indicative of whether the borrower-requested loan terms of a particular borrowing order satisfy the lender-requested loan terms of a particular lending order and a second value representative of an amount of the particular lending order to be allocated to the particular borrowing order during a current cycle of a multi cyclic optimization process, and
   wherein during each cycle of the optimization process, the matcher is configured to:
      identify for each borrowing order pending during a current cycle, a set of composite loans that satisfies the borrower-requested loan terms of each respective borrowing order, at least some of the composite loans of the set being comprised of a plurality of atomic loans that are defined in part by one or more lending orders;
      generate from amongst the identified sets of composite loans, a set of feasible composite loan combinations, each feasible composite loan combination being comprised of a plurality of composite loans and satisfying the borrower-requested loan terms of all borrowing orders pending during the current cycle; and
      select from amongst the set of feasible composite loan combinations, a subset of composite loans to be provided as matches to respective borrowing orders that are pending during the current cycle.

2. The apparatus of claim 1, wherein said receivers are implemented as a part of a web site.

3. The apparatus of claim 1, wherein each criterion of said criteria is assigned a respective weight in said utility function.

4. The apparatus of claim 1, wherein one of said criterions is a Customer Satisfaction Index (CSI).

5. The apparatus of claim 1, wherein said matcher is further configured to populate at least one of said dimensions of said matrix with at least one value representing a respective loan term in a respective order, said value belonging to a discrete value range.

6. The apparatus of claim 1, wherein said matcher is further configured to divide said matrix into a plurality of sub matrixes, wherein each of said sub-matrixes is characteristic of a certain loan market.

7. The apparatus of claim 1, wherein said matcher is further configured to provide said matches using a greedy algorithm aiming at equally distributing a borrowing order between a plurality of lending orders, thereby to achieving a uniform distribution of risk between said lenders.

8. The apparatus of claim 1, wherein said matcher is further configured to provide said match utilizing a correlation coefficient indicating a distribution between borrowing orders matched with said current lending order.

9. The apparatus of claim 1, wherein said lending order receiver is configured to communicate with said at least one lender via a communication network, for receiving said lending order.

10. The apparatus of claim 1, wherein said borrowing order receiver is configured to communicate with said at least one borrower via a communication network, for receiving said borrowing order.

11. The apparatus of claim 1, further comprising a subsidizer order receiver, associated with said matcher and configured to receive at least one subsidizer order from at least one subsidizer, said subsidizer order comprising subsidizer-requested loan terms, wherein said matcher is further configured to provide a match to said current lending order from amongst said borrowing orders and said subsidizer orders, such that said matched orders are mutually satisfied with respect to said loan terms and subsidy terms.

12. The apparatus of claim 1, further comprising a secondary sale manager, configured to receive a sale order from a first lender offering to sell his position as a lender in an existing loan, to receive a buying order from a second lender willing to buy a position of a lender in an existing loan, and to manage the sale of said position of said first lender to said second lender, according to terms defined in said orders.

13. The apparatus of claim 1, further comprising a secondary sale manager, configured to receive a sale order from a first lender offering to sell his position as a lender in an existing portfolio loan, to receive buying orders from other lenders willing to buy part or all of a position of a lender in an existing loan, and to manage the sale of said position of said first lender to said other lenders, according to terms defined in said orders.

14. The apparatus of claim 1, further comprising a secondary sale manager, configured to receive a sale order from a first lender offering to sell his position as a lender in an existing loan, to derive a buying orders from a lending orders received from other lenders willing to buy part or all of a position of a lender in an existing loan, and to manage the sale and transfer of said position of said first lender to said other lenders, according to terms defined in said orders, through the matching process.

15. The apparatus of claim 1, further comprising a loan manager, associated with said matcher and further configured to manage at least one portfolio loan according to said matches, said portfolio loan including at least one atomic loan relating to one respective lending order and one respective borrowing order.

16. The apparatus of claim 15, wherein said loan manager is further configured to calculate a correlation coefficient indicating correlation among borrowing orders in said portfolio loan.

17. The apparatus of claim 1, further comprising a loan manager, associated with said matcher and further configured to manage at least one composite loan according to said matches, said composite loan including at least one atomic loan relating to one respective lending order and one respective borrowing order.

18. The apparatus of claim 17, wherein said lending orders differ with respect to lender-requested loan terms.

19. The apparatus of claim 17, wherein said borrowing orders differ with respect to borrower-requested loan terms.

20. The apparatus of claim 1, further comprising a loan manager, associated with said matcher and configured to manage the execution of loans, based on said provided match, using escrow agents.

21. The apparatus of claim 1, comprising a loan manager, associated with said matcher and configured to manage the execution of said loans, based on said provided match, using escrow agents providing money transfer services to at least one of a group comprising said lender and borrower.

22. The apparatus of claim 1, further comprising an external loan market interface manger, configured to manage an interface, for exchanging data between the apparatus and an external-apparatus managing a loan market external to a loan market managed by the apparatus, said data including at least one of a group comprising: loan data, sale order data, borrowing order data, and lending order data, thereby allowing initiating processing and trading loans involving at least two loan markets.

23. The apparatus of claim 1, further comprising a loan profile receiver, configured to receive a loan profile, said loan profile comprising default loan terms, wherein at least one of said receivers is further configured to use said default loan terms for an order received from said one of said borrowers and lenders.

24. The apparatus of claim 1, wherein said lender-requested loan terms comprise lender-requested risk terms and said matcher is further configured to use pre-obtained borrower-ratings for automatically providing said match, each of said borrower-ratings pertaining to a respective borrower.

25. The apparatus of claim 1, wherein said matcher is further configured to automatically provide a match to a plurality of said lending orders amongst a plurality of said borrowing orders.

26. Method for generating and processing lending and borrowing orders in a networked loan market and management system, the method comprising:
   receiving borrowing orders over a communication network from at least one computing device operable by a borrower, each borrowing order comprising borrower-requested loan terms;
   receiving lending orders over the communication network from at least one computing device operable by a lender, each lending order comprising lender-requested loan terms; and
   automatically matching by a computer borrowing orders and lending orders using a multi cyclic process that is optimized according to criteria of an operator-definable utility function, and a multi dimensional matrix of cells populated according to said orders,
   wherein each cell of the matrix includes a first value indicative of whether the borrower-requested loan terms of a particular borrowing order satisfy the lender-requested loan terms of a particular lending order and a second value representative of an amount of the particular lending order to be allocated to the particular borrowing order during a current cycle of a multi cyclic optimization process, and
      wherein during each cycle of the optimization process, the matching includes:
         identifying for each borrowing order pending during a current cycle, a set of composite loans that satisfies the borrower-requested loan terms of each respective borrowing order, each composite loan of the set being comprised of a set of atomic loans that are defined in part by one or more lending orders;
         generating from amongst the identified sets of composite loans, a set of feasible composite loan combinations, each feasible composite loan combination being comprised of a plurality of composite loans and satisfying the borrower-requested loan terms of all borrowing orders pending during the current cycle; and
      selecting from amongst the set of feasible composite loan combinations, a subset of composite loans to be provided as matches to respective borrowing orders that are pending during the current cycle.

27. The method of claim 26, further comprising an initial step of allowing an operator to define a utility function usable for said providing said match.

28. The method of claim 26, further comprising receiving at least one subsidizer order from at least one subsidizer, said subsidizer order comprising subsidizer-defined subsidy terms, wherein said providing a match includes providing a match to said current lending order from amongst said borrowing orders and said subsidizer orders, such that said matched orders are mutually satisfied with respect to said loan terms and subsidy terms.

29. The method of claim 26, further comprising receiving a sale order from a first lender offering to sell his position as a lender in an existing loan, receiving a buying order from a second lender willing to buy a position of a lender in an existing loan, and managing the sale of said position of said first lender to said second lender, according to terms defined in said orders.

30. The method of claim 26, further comprising receiving a sale order from a first lender offering to sell his position as a lender in an existing loan, deriving at least one buying order from a lending order received from a second lender willing to buy a position of a lender in an existing loan, and managing the sale of said position of said first lender to said second lender, according to terms defined in said orders.

31. The method of claim 26, further comprising exchanging data with an external loan market, said data including at least one of a group comprising: loan data, sale order data, borrower data, and lender data, thereby allowing loan trading involving at least two loan markets.

32. The method of claim 26, further comprising managing the execution of loans, based on said provided match, using escrow agents.

33. The method of claim 26, further comprising managing the execution of loans, based on said provided match, using escrow agents providing money transfer services between said lender and borrower.

34. The method of claim 26, further comprising receiving a loan profile from an operator, said loan profile comprising default loan terms, wherein said default loan terms are used for an order received from one of said borrowers and lenders.

35. The method of claim 26, further comprising using pre-obtained borrower-ratings for automatically providing said match, wherein each of said borrower-ratings pertains to a respective borrower and said lender-requested loan terms comprise lender-requested risk terms.

36. The method of claim 26, further comprising automatically providing a match to a plurality of said lending orders amongst a plurality of said borrowing orders.

37. The method of claim 26, further comprising presenting at least some of said matched orders to a lender as a portfolio loan.

38. The method of claim 26, further comprising presenting at least some of said matched orders to a borrower as a composite loan.

39. The method of claim 26, further comprising managing collaterals with respect of said matched orders.

40. The method of claim 26, further comprising managing signing process and signatures for said matched orders.

41. The method of claim 40, wherein said signatures are biometric.

42. The method of claim 40, wherein said signatures are electronic.

43. The method of claim 40, wherein said signatures are natural.

44. The method of claim 26, further comprising carrying out a debt collection process.

45. The apparatus of claim 1, further comprising a workflow engine, configurable for managing a workflow process for initiating, executing, and collecting a loan resultant upon said provided match.

46. The method of claim 26, further comprising managing a workflow process for initiating, executing, and collecting a loan resultant upon said providing of a match.

47. The apparatus of claim 1, wherein the borrowing orders of the sets are selected so as to identify an optimal combination of provided matches across the lending orders of a given cycle of a multi cyclic optimization process.

48. The method of claim 26, wherein the borrowing orders of the sets are selected so as to identify an optimal combination of provided matches across the lending orders of a given cycle of a multi cyclic optimization process.

* * * * *